(12) United States Patent
Cantley et al.

(10) Patent No.: US 11,702,601 B2
(45) Date of Patent: Jul. 18, 2023

(54) SYSTEMS AND METHODS FOR SEPARATING WATER AND REMOVING SOLIDS FROM PRE-TREATED AND UNFILTERED FEEDSTOCK

(71) Applicant: MARATHON PETROLEUM COMPANY LP, Findlay, OH (US)

(72) Inventors: Gregory A. Cantley, Findlay, OH (US); Paul J. Dofton, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 17/452,455

(22) Filed: Oct. 27, 2021

(65) Prior Publication Data
US 2022/0135449 A1     May 5, 2022

Related U.S. Application Data

(60) Provisional application No. 63/198,960, filed on Nov. 25, 2020, provisional application No. 63/198,937,
(Continued)

(51) Int. Cl.
*C10G 31/08*     (2006.01)
*B01D 17/02*     (2006.01)
(Continued)

(52) U.S. Cl.
CPC ............ *C10G 31/08* (2013.01); *B01D 17/02* (2013.01); *C02F 1/04* (2013.01); *C02F 1/48* (2013.01); *C02F 9/00* (2013.01); *C10G 31/06* (2013.01); *B01D 17/06* (2013.01); *C02F 1/02* (2013.01); *C02F 1/441* (2013.01); *C02F 1/74* (2013.01); *C02F 2001/007* (2013.01); *C02F 2101/105* (2013.01); *C02F 2101/20* (2013.01); *C02F 2103/322* (2013.01); *C02F 2103/365* (2013.01);
(Continued)

(58) Field of Classification Search
None
See application file for complete search history.

(56) References Cited

U.S. PATENT DOCUMENTS 4,904,383 A    2/1990   Auerswald
7,244,364 B1 * 7/2007  Weber .................. B01D 21/01
                                                210/708
(Continued)

FOREIGN PATENT DOCUMENTS

CN    103627433     3/2014
WO    2006/005085   1/2006
WO    2014/066396   5/2014

OTHER PUBLICATIONS

Lavanya et al. (Bioresource Technology, 2016, 203, 228-235). (Year: 2016).*
(Continued)

*Primary Examiner* — Clare M Perrin
(74) *Attorney, Agent, or Firm* — Womble Bond Dickinson (US) LLP

(57) ABSTRACT

Systems and methods to separate water and remove solids from a pre-treated and unfiltered renewable feedstock at or separate from a refinery. Such systems and methods may be used to provide a reduced-contaminant and reduced-solid renewable feedstock for further refining.

29 Claims, 26 Drawing Sheets

Related U.S. Application Data filed on Nov. 24, 2020, provisional application No. 63/198,606, filed on Oct. 29, 2020.

(51) Int. Cl.

| | | |
|---|---|---|
| C02F 1/04 | (2023.01) | |
| C02F 1/48 | (2023.01) | |
| C02F 9/00 | (2023.01) | |
| C10G 31/06 | (2006.01) | |
| B01D 17/06 | (2006.01) | |
| C02F 1/02 | (2023.01) | |
| C02F 1/44 | (2023.01) | |
| C02F 1/74 | (2023.01) | |
| C02F 1/00 | (2023.01) | |
| C02F 101/10 | (2006.01) | |
| C02F 101/20 | (2006.01) | |
| C02F 103/32 | (2006.01) | |
| C02F 103/36 | (2006.01) | |
| C10G 9/06 | (2006.01) | |

(52) U.S. Cl.
CPC .... C02F 2209/001 (2013.01); C02F 2209/02 (2013.01); C02F 2209/44 (2013.01); C10G 9/06 (2013.01); C10G 2300/205 (2013.01); C10G 2300/4006 (2013.01); C10G 2300/4012 (2013.01)

(56) References Cited

U.S. PATENT DOCUMENTS

| | | | |
|---|---|---|---|
| 7,872,054 B2 | 1/2011 | Cortright et al. | |
| 7,989,664 B2 | 8/2011 | Cortright | |
| 8,017,818 B2 | 9/2011 | Cortright et al. | |
| 8,192,628 B2* | 6/2012 | Cranford | C12N 1/06 |
| | | | 210/639 |
| 8,231,857 B2 | 7/2012 | Cortright et al. | |
| 8,273,138 B2 | 9/2012 | Bauldreay et al. | |
| 8,350,108 B2 | 1/2013 | Cortright et al. | |
| 8,466,330 B2 | 6/2013 | Bauldreay et al. | |
| 8,642,813 B2 | 2/2014 | Qiao et al. | |
| 8,697,924 B2 | 4/2014 | Bauldreay et al. | |
| 8,710,281 B2 | 4/2014 | Nagaki et al. | |
| 8,784,645 B2 | 7/2014 | Iguchi et al. | |
| 8,834,587 B2 | 9/2014 | Cortright et al. | |
| 8,962,902 B2 | 2/2015 | Blommel et al. | |
| 9,206,366 B2 | 12/2015 | Bauldreay et al. | |
| 9,314,778 B2 | 4/2016 | Blank et al. | |
| 9,453,169 B2 | 9/2016 | Stippich, Jr. et al. | |
| 9,593,054 B2 | 3/2017 | Kania et al. | |
| 9,656,937 B2 | 5/2017 | Held et al. | |
| 9,725,777 B2 | 8/2017 | Qiao et al. | |
| 9,765,261 B2 | 9/2017 | Qiao et al. | |
| 9,862,893 B2 | 1/2018 | Gray et al. | |
| 9,873,836 B2 | 1/2018 | Blommel et al. | |
| 9,873,837 B2 | 1/2018 | Qiao et al. | |
| 9,878,966 B2 | 1/2018 | Blommel et al. | |
| 9,988,585 B2 | 6/2018 | Hayasaka et al. | |
| 10,005,700 B2 | 6/2018 | Beck et al. | |
| 10,071,322 B2 | 9/2018 | Coppola et al. | |
| 10,370,596 B2 | 8/2019 | Blommel et al. | |
| 10,975,319 B2 | 4/2021 | Price et al. | |
| 11,130,914 B2 | 9/2021 | Blommel et al. | |
| 11,613,715 B1 | 3/2023 | Womeldorff et al. | |
| 2008/0149486 A1* | 6/2008 | Greaney | B08B 17/00 |
| | | | 204/570 |
| 2009/0159426 A1* | 6/2009 | Chen | C10G 33/02 |
| | | | 422/186.04 |
| 2012/0280175 A1 | 11/2012 | Kania et al. | |
| 2012/0323053 A1 | 12/2012 | Qiao et al. | |
| 2013/0019859 A1 | 1/2013 | Qiao et al. | |
| 2013/0023702 A1 | 1/2013 | Qiao et al. | |
| 2013/0036660 A1 | 2/2013 | Woods et al. | |
| 2013/0043192 A1* | 2/2013 | Smith | B01D 17/048 |
| | | | 210/708 |
| 2014/0187828 A1 | 7/2014 | Bauldreay et al. | |
| 2014/0350317 A1 | 11/2014 | Blommel et al. | |
| 2015/0165488 A1 | 6/2015 | Powell et al. | |
| 2015/0183701 A1 | 7/2015 | Blank et al. | |
| 2015/0315055 A1 | 11/2015 | Chidambaran et al. | |
| 2016/0115432 A1* | 4/2016 | Dahiya | C12M 29/24 |
| | | | 435/289.1 |
| 2016/0214028 A1 | 7/2016 | Coppola et al. | |
| 2016/0326448 A1 | 11/2016 | Bauldreay et al. | |
| 2016/0362756 A1 | 12/2016 | Qiao et al. | |
| 2017/0044443 A1 | 2/2017 | Blommel et al. | |
| 2020/0048569 A1 | 2/2020 | Karvo et al. | |
| 2020/0172817 A1 | 6/2020 | Davidson et al. | |
| 2021/0009911 A1 | 1/2021 | Medoff | |
| 2022/0041939 A1 | 2/2022 | Tiitta et al. | |
| 2023/0072588 A1 | 3/2023 | Blommel et al. | |
| 2023/0122414 A1 | 4/2023 | Blommel et al. | |
| 2023/0125062 A1 | 4/2023 | Blommel et al. | |

OTHER PUBLICATIONS

Pruneda et al. (J. Mex. Chem. Soc. 2005, 49, 14-19). (Year: 2005).*

Pathak et al. (Chapter 9: Feedstock Transportation, Agricultural Processing, Logistic from Farm to Bio-refinery: Recent Developments, Mechanization, and Cost Analysis in Sustainable Biofuels Development in India, Chandal, Sukumaran, Springer, 2017, pp. 207-221). (Year: 2017).*

Show et al. ("Algal biomass dehydration", Bioresource Technology, 2013, 135, 720-729). (Year: 2013).*

Humooudi et al. (American Scientific research Journal for Engineering, Technology and Sciences, 2017, 36, 224-241). (Year: 2017).*

International Search Report and Written Opinion for International Application No. PCT/US2021/072086, dated Jan. 28, 2022 (dated Jan. 28, 2022).

International Search Report and Written Opinion for International Application No. PCT/US2021/072052, dated Jan. 27, 2022 (dated Jan. 27, 2022).

Van Dyk et al., "Potential synergies of drop-in biofuel production with further co-processing at oil refineries", Biofuels, Bioproducts and Biorefining, Society of Chemical Industry and John Wiley & Sons, Ltd., pp. 760-775, 2019.

* cited by examiner

SYSTEMS AND METHODS FOR SEPARATING WATER AND REMOVING SOLIDS FROM PRE-TREATED AND UNFILTERED FEEDSTOCK

CROSS-REFERENCE TO RELATED APPLICATIONS

The present application is related to U.S. Provisional Application No. 63/198,606 filed Oct. 29, 2020, U.S. Provisional 63/198,937 filed Nov. 24, 2020, and U.S. Provisional Application No. 63/198,960 filed Nov. 25, 2020, the disclosures of which are incorporated herein by reference in their entirety.

FIELD OF THE DISCLOSURE

The disclosure herein relates to systems and methods for separating water from pre-treated feedstock. One or more embodiments of such systems and methods may be suitable for separating water from a bio or renewable feedstock that has been pre-treated in a hydrothermal cleaning process at or separate from the refinery.

BACKGROUND

Due to demand for renewable transportation fuel, various feedstock of varying levels of contamination may be considered. Such bio or renewable feedstock may be relatively inexpensive, but, due to the contamination, may require pre-treating prior to processing in a refinery. Further, such feedstock may include an amount of solids. Such feedstock may include plant oils, algal and microbial oils, waste vegetable oils, yellow and brown grease, tallow, soap stock, pyrolysis oils from plastic or cellulose, and petroleum fractions. The feedstock listed may not be usable due to contamination and the amount of solids unless, as noted, pre-treated and filtered prior to being utilized in typical refinery operations. Such contamination may cause issues in refinery equipment, such as catalyst bed and heat exchanger fouling.

For example, renewable plant oils typically contain phospholipid compounds or complexes. The phosphorous in phospholipids may create issues in refinery equipment, as noted. For example, phosphorus may poison and deactivate catalysts utilized in hydrotreating, hydrocracking, and hydroisomerization processes. Such issues may lead to more frequent catalyst replacement, which may increase operation costs significantly. Catalysts may be protected using guard beds containing alumina or similar high-surface area materials. The alumina or similar material may absorb low concentrations of metal and phosphorus compounds. Such an approach may increase cost, however, for renewable feedstock, as the renewable feedstock may contain high levels of metals and phosphorus compounds. Further, phosphorus is a nucleating site and catalyst for coke formation. As such, renewable plant oils and other feedstock that are high in phosphorus may cause fouling or coking in fired-furnaces and heat exchangers. These issues, namely fouling and coking, may increase downtime, for example, for decoking and maintenance.

There are several methods to remove metals and phosphorus compounds, including the hydrothermal cleaning process or hydrothermal reaction. Such a process may include combining a renewable feedstock or other feedstock including high levels of metals and/or phosphorus compounds with water. The water and feedstock may be heated and transported to a hydrothermal reactor. Utilizing a combination of temperature (for example, about 465° F. to about 575° F.), pressure, and flow conditions over a period of time, the hydrothermal reactor may wash the metals or phosphorus compounds from the renewable feedstock into the water contained in the combination of the water and feedstock. Prior to further refinement of the feedstock in a refinery, the water may be separated from the feedstock.

Salt compounds may typically be limited in crude feedstock for similar reasons as metals and phosphorus, as noted above. For example, salt compounds may cause corrosion, coking, and/or catalyst fouling issues. Conventional desalting processes (for example, via an electrostatic precipitation unit and/or crude desalter unit) may mix petroleum crude oil and water at elevated temperatures through a mixing valve to form a mixed or blended stream. The mixed or blended stream may be fed to a large oil-water separator. The water in the mix or blend may absorb the salt compounds. The separation of water (e.g., the water including the salt compounds) from the feedstock may be facilitated by passing high frequency alternating current or a direct current (for example, via an electrostatic precipitation unit including a grid-like structure of electrodes) through the mixture or blend of the water and feedstock to cause small water droplets to form. Demulsifying agents may also be utilized to facilitate removal of water. Typically, renewable feedstock, such as waste vegetable oil, yellow and brown grease, and tallow, were thought to be difficult to desalt using conventional electrostatic precipitation units and/or crude desalter units, in part, due to the conductivity of these oils and their potential to form soaps and emulsions.

Typically, a large separator (for example, a Stokes Law separator) is used to remove water from pre-treated feedstock following a hydrothermal cleaning unit or hydrothermal reactor. In such examples, the large separator may not be typical for a refinery and may take up large amounts of space, thus increasing overall refinery operation costs and decreasing available real estate for other processes and/or equipment. Further, such a separator may not completely remove the water from pre-treated feedstock from the hydrothermal cleaning unit or hydrothermal reactor (e.g., such a separator may remove all but 2% of water from the pre-treated feedstock). While the amount of metal and/or phosphorus leftover may be small, over time such a small amount may accumulate in downstream refinery equipment, causing fouling and/or coking, among other issues. Further still, the separator may take longer periods (for example, hours rather than minutes) of time to remove the water, since such a separator may rely on time for the feedstock and water to naturally separate or settle.

Typically, if a feedstock includes solids, those solids may be removed at some point in the refinery. The further along in the refining process, the costlier such filtration may be, such as via centrifuges, which are large and costly to operate. Further, renewable feedstock may include some amount of solids. Adding new equipment to filter prior to transfer into the refinery may be costly as well.

Accordingly, Applicants have recognized a need for systems and methods to provide separation of water and removal of solids from the pre-treated and unfiltered renewable feedstock (or feedstock including metal, phosphorus compounds, and/or an amount of solids) utilizing a crude desalter unit, electrostatic precipitation units, and/or a settler. The present disclosure is directed to embodiments of such systems and methods.

SUMMARY OF THE DISCLOSURE

The present disclosure is generally directed to systems and methods to provide separation of water and removal of solids from the pre-treated and unfiltered renewable feedstock (or any feedstock including metal, phosphorus compounds, and/or solids) utilizing a crude desalter unit, electrostatic precipitation units, and settler. The water and renewable feedstock may be combined and heated. The combined and heated water and renewable feedstock may be transported (for example, via piping) to a hydrothermal reactor or hydrothermal cleaning unit. The hydrothermal reactor or hydrothermal cleaning unit may wash the contaminants from the renewable feedstock into the water. The water including or containing the contaminants may be separated from the feedstock in an electrostatic precipitation unit or crude desalter unit (for example, the crude desalter unit including an electrostatic precipitator). Further, during a residence time of the electrostatic precipitation unit or crude desalter unit, the amount of solids may be allowed to settle, with the aqueous phase, to the bottom of the electrostatic precipitation unit or crude desalter unit. The water and solids may be transported or stored (e.g., for waste-water treatment, for use in another process within a refinery, or for re-use in the hydrothermal reactor, hydrothermal cleaning unit, electrostatic precipitation unit, and/or crude desalter unit). The feedstock, which may be free or substantially free of water, metals, phosphorus compounds, salt compounds, solids, and/or other inorganic contaminants, may be transported to a storage tank or to other refinery equipment for further processing.

Accordingly, an embodiment of the disclosure is directed to a refinery process for separating water and solids from a pre-treated and unfiltered renewable feedstock. The process may include passing a blend of water, a renewable feedstock (e.g., one or more of plant oils, algal and microbial oils, waste vegetable oils, yellow and brown grease, tallow, soap stock, pyrolysis oils from plastic or cellulose, and petroleum fractions), and solids to a hydrothermal reactor of a refinery. The process may include washing contaminants, via the hydrothermal reactor, contained in the renewable feedstock into the water for a first time interval. The process may include, after the first time interval, passing the blend of water, renewable feedstock, and solids to an electrostatic precipitation unit at the refinery. The process may include separating, by electrostatic precipitation within the crude desalter unit, the water containing the contaminants from the renewable feedstock to create water containing the contaminants and a contaminant free or substantially contaminant free renewable feedstock for a second time interval. The crude desalter unit may include a grid of electrodes connected to an external voltage generator. A voltage of about 10,000 volts to about 30,000 volts applied to the grid of electrodes may induce electrostatic precipitation. The refinery process may include settling, in the electrostatic precipitation unit, the solids included in the renewable feedstock, as part of the aqueous phase, to a bottom portion of the electrostatic precipitation unit during the second time interval. The refinery process may include, after the second time interval, passing the reduced-contaminant and reduced-solids renewable feedstock to a distillation tower of the refinery.

The process may further include heating the renewable feedstock, prior to blending, to a temperature sufficient for hydrothermal reaction in the hydrothermal reactor. The process may also include heating the water, prior to blending, to a temperature sufficient for hydrothermal reaction in the hydrothermal reactor. The process may include, rather than heating the renewable feedstock and/or water prior to blending, heating the blend of water and renewable feedstock prior to transporting the blend of water and renewable feedstock to the hydrothermal reactor.

Another embodiment of the disclosure is directed to a refinery process for separating water and solids from a pre-treated and unfiltered renewable feedstock. The process may include passing a blend of water, a renewable feedstock, and solids to a hydrothermal reactor of a refinery. The process may include washing contaminants, via the hydrothermal reactor, contained in the renewable feedstock into the water for a first time interval. The process may include, after the first time interval, passing the blend of water, renewable feedstock, and solids to a settler of the refinery. The process may include settling, in the settler, the solids included in the renewable feedstock to a bottom portion of the settler for a second time interval. The process may include, after the second time interval, passing the reduced-solid blend of water and renewable feedstock to an electrostatic precipitation unit of the refinery. The process may include separating, by electrostatic precipitation within the crude desalter unit, the water containing the contaminants from the renewable feedstock to create water containing the contaminants and a contaminant free or substantially contaminant free renewable feedstock for a third time interval. The refinery process may include, after the third time interval, passing the reduced-contaminant and reduced-solids renewable feedstock to a fractionation column of the refinery.

Another embodiment of the disclosure is directed to a refinery process for separating water and removing solids from a pre-treated and unfiltered renewable feedstock. The process may include injecting water, from a water tank or source at a refinery, in a renewable feedstock stream, from a feedstock tank or source at the refinery, to create a blend of water and renewable feedstock. The renewable feedstock may include an amount of solids The process may include passing the blend to a heat exchanger to heat the blend. The process may include passing the heated blend to a hydrothermal reactor of the refinery. The process may include washing contaminants, via a hydrothermal reactor contained in the renewable feedstock into the water over a first time interval. The process may include, after the first time interval, passing the blend to an electrostatic precipitation unit of the refinery. The process may include separating, via the electrostatic precipitation unit, the water containing the contaminants from the renewable feedstock to create water containing the contaminants and a contaminant free renewable feedstock. The process may include, during separation, allowing the amount of solids in the renewable feedstock to settle, with the aqueous phase, to a bottom portion of the electrostatic precipitation unit The process may include passing the contaminant free renewable feedstock to refinery process equipment, such as a reactor, a distillation tower or column, or a fractionation column.

Another embodiment of the disclosure is directed to a method for separating water and removing solids from a pre-treated and unfiltered renewable feedstock. The method may include passing, from a reactor (e.g., a hydrothermal reactor), a mixture including a renewable feedstock (e.g., consolidated grain and barge degummed soy bean oil (SBO), degummed SBO, used soy bean oil, used corn oil, and/or used cooking oil) and contaminant-rich water to an electrostatic precipitation unit or crude desalter unit. The method may include separating, via the electrostatic precipitation unit, the contaminant-rich water from the renewable feedstock to generate a contaminant-rich water stream and a reduced-contaminant renewable feedstock stream. Finally, the method may include, during separation, allowing the amount of solids in the renewable feedstock to settle to a bottom portion of the electrostatic precipitation unit.

The electrostatic precipitation unit, in an example, may be located at or separate from a refinery. If the electrostatic precipitation unit is located separate from the refinery, then the method may further include passing the reduced-contaminant feedstock stream to the refinery, via a transportation vehicle, for further processing. If the electrostatic precipitation unit is located at the refinery, then the method may include passing the reduced-contaminant feedstock stream to a fractionation column or distillation tower.

After separation via the electrostatic precipitation unit, the reduced-contaminant renewable feedstock stream may contain less than 0.4% of water in relation to the total amount of the reduced-contaminant renewable feedstock stream or, in another example, trace amounts of water.

Another embodiment of the disclosure is directed to a refinery system for separating water and removing solids from a pre-treated and unfiltered renewable feedstock. The system may include a source of a renewable feedstock and a source of water. The renewable feedstock may include an amount of solids. The system may include a flow control valve connected to and in fluid communication with the source of renewable and connected to and in fluid communication with the source of water. The flow control valve may be configured to mix the water renewable feedstock stream to create a blend of water and renewable feedstock.

The refinery system may include a hydrothermal cleaning unit, positioned at the refinery, connected to and in fluid communication with the flow control valve to accept the blend. The hydrothermal cleaning unit may wash contaminants contained in the renewable feedstock into the water over a first time interval. The system may include an oil-water separator, at the refinery, connected to and in fluid communication with the hydrothermal cleaning unit. The oil-water separator may accept the blend from the hydrothermal cleaning unit. The oil-water separator may provide a residence time to separate the renewable feedstock from the water containing the contaminants and to allow the amount of solids to settle, with the aqueous phase, to a bottom of the oil-water separator. The system may include a secondary oil-water separator unit, at the refinery, connected to and in fluid communication with the oil-water separator. The secondary oil-water separator may accept the renewable feedstock therefrom. The secondary oil-water separator may include an electrostatic precipitator configured to further separate water from the renewable feedstock and to allow any remaining solids to settle to a bottom of the secondary oil-water separator.

Another embodiment of the disclosure is directed to a controller to operate a hydrothermal cleaning unit and electrostatic precipitation unit to separate water and remove solids from a pre-treated and unfiltered renewable feedstock at a refinery. The controller may include a first input/output in signal communication with a flow control valve of the refinery. The flow control valve may combine an amount of a water stream containing water and an amount of a feedstock stream containing a contaminant-rich renewable feedstock and an amount of solids to create a blend of the water, contaminant-rich renewable feedstock, and solids. The controller may be configured, in relation to the flow control valve, to determine the amount of the water stream to combine with the feedstock stream, based on a type of contaminant-rich renewable feedstock contained in the feedstock stream. The controller may include a second input/output in signal communication with a heat exchanger of the refinery, the heat exchanger to heat the blend of the water and contaminant-rich renewable feedstock to a specified temperature. The controller may be configured, in relation to the heat exchanger, to determine the specified temperature based on a first length of time for a hydrothermal reaction. The controller may include a third input/output in signal communication with a hydrothermal reactor of the refinery. The hydrothermal reactor may wash contaminants in the contaminant-rich renewable feedstock into the water over the first length of time to generate contaminant-rich water and a pre-treated renewable feedstock. The controller may be configured, in relation to the hydrothermal reactor, to determine the first length of time based on an amount of contaminants in the contaminant-rich renewable feedstock. The controller may include a fourth input/output in signal communication with an electrostatic precipitation unit of the refinery. The electrostatic precipitation unit separates the contaminant-rich water from the pre-treated renewable feedstock over a second length of time. The controller may be configured, in relation to the electrostatic precipitation unit, to determine the second length of time based on the amount of contaminants in the contaminant-rich water and an estimated amount of solids in the contaminant-rich water pre-treated renewable feedstock. The controller may further be configured, in relation to the electrostatic precipitation unit, to determine an amount of power to provide to the electrostatic precipitation unit to polarize the contaminant-rich water and cause the polarized water to pool at the bottom of the electrostatic precipitation unit, allowing for removal of the contaminant-rich water. The second length of time may allow the amount of solids to settle at a bottom of the electrostatic precipitation unit, the amount of solids to be removed with the contaminant-rich water.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other implementations, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

Figure 10:
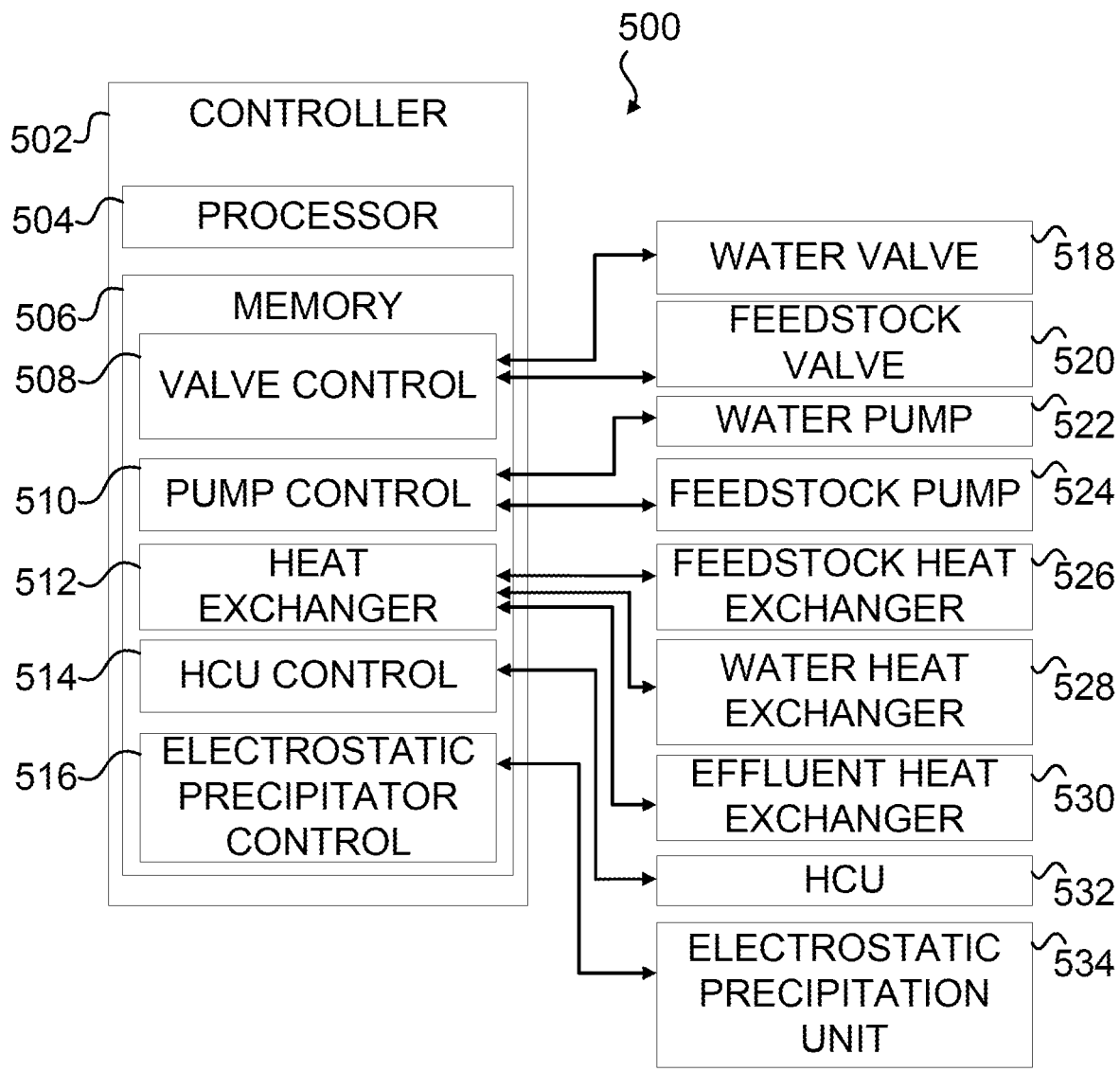
Figure 11:
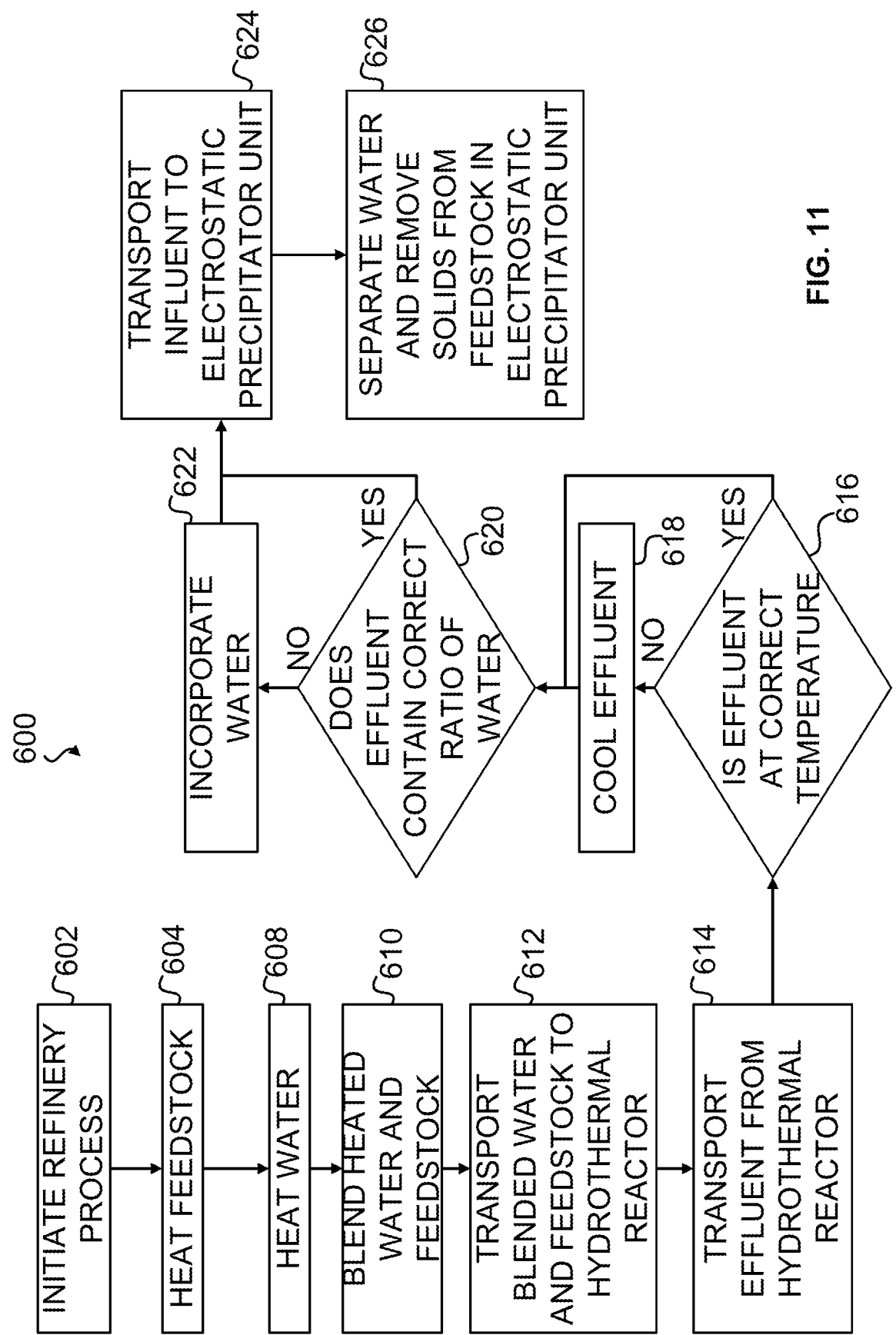

Having thus described the disclosure in general terms, reference will now be made to the accompanying drawings, which are not necessarily drawn to scale, and wherein:

FIGS. 1A through 9E are schematic diagrams illustrating systems for separating water and removing solids from a pre-treated and unfiltered feedstock, according to an embodiment of the disclosure;

FIG. 10 is a simplified block diagram illustrating a control system for managing the separation of water and removal of solids from a pre-treated and unfiltered feedstock at a refinery, according to an embodiment of the disclosure; and FIG. 11 is a flow diagram, implemented in a controller, for managing the separation of water and removal of solids from a pre-treated and unfiltered feedstock, according to an embodiment of the disclosure.

FIGS. 12A through 12H are charts including time until and amount of water separation of oil and basic water and sediment (BS&W) values.

DETAILED DESCRIPTION OF THE DISCLOSURE

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to systems and methods for the separation of water and removal of solids from a pre-treated and unfiltered feedstock via a crude desalter unit and/or an electrostatic precipitator at or separate from a refinery. In one or more embodiments, system and methods for providing separation of water and removal of solids from a pre-treated and unfiltered renewable feedstock for further refinement at a refinery are provided. While typical petroleum based feedstock may not include significant amounts of metal or phosphorus (e.g., the amount of phosphorus in a petroleum based feedstock may be undetectable or at about 1 to 2 parts per million (PPM)), renewable feedstock, however, may include significant amounts metal, phosphorus, and/or other contaminants (e.g., an amount significant enough to cause fouling, coking, or other issues within refinery equipment, such as PPM in the hundreds to thousands). Removal of such metals, phosphorus, and/or other contaminants may be performed via a hydrothermal cleanup process (e.g., the hydrothermal cleanup process performed via a hydrothermal cleaning unit or hydrothermal reactor). The hydrothermal cleanup process may introduce an amount of water to the feedstock at a particular temperature, pressure, and/or time. The water may be removed (e.g., via a crude desalter unit or electrostatic precipitator) prior to further refinement to ensure proper and efficient operation of refinery equipment. Further, the water may be saturated with or contain the metal, phosphorus compounds, salt compounds, and/or other contaminants in the feedstock. In addition to the metals and phosphorous, the feedstock may contain an amount of solids. The solids may be leftovers from processing the feedstock prior to shipment at the refinery (e.g., organic matter).

A large separator (for example, a Stokes Law separator) may be used to remove water from pre-treated feedstock following a hydrothermal cleaning unit or hydrothermal reactor. In such examples, the large separator may not be typical for a refinery and may take up large amounts of space, thus increasing overall refinery operation costs and decreasing available real estate for other processes and/or equipment. Further, such a separator may not completely remove the water from the pre-treated feedstock from the hydrothermal cleaning unit or hydrothermal reactor (e.g., such a separator may remove all but 1.5%, 2%, 4%, or even 6% of water from the pre-treated feedstock). Further still, the separator may take longer periods of time (e.g., hours rather than minutes) to remove the water, as such a separator may rely on time for the feedstock and water to naturally separate or settle.

Rather than utilizing the large separator described above, the present disclosure describes the use of a crude desalter unit and/or electrostatic precipitation unit, which despite expectations, has been discovered to efficiently remove or separate water and remove solids from effluent, pre-treated feedstock, or feedstock (e.g., feedstock containing high levels of metal, phosphorus, and/or solids). Typically, refineries include a crude desalter unit and/or electrostatic precipitation units, thus decreasing the need for new equipment. By increasing the amount of water (e.g., fresh water or water fed back from the crude desalter unit or electrostatic precipitation unit) in the effluent or pre-treated feedstock if the effluent or pre-treated feedstock does not include enough water, the crude desalter unit or electrostatic precipitation unit may be operated to properly remove the water from the effluent or pre-treated feedstock. Further, the amount of water to be mixed with the effluent or pre-treated feedstock may vary based on the type of feedstock and the amount of metal and/or salt in the feedstock (for example, choice white grease may include less contaminants than packers tallow and thus require less water for removal of contamination). In another example, the amount of water in the effluent or pre-treated feedstock may be sufficient for the crude desalter unit or electrostatic precipitation unit to be operated to properly remove the water from the effluent or pre-treated feedstock. As used herein, effluent may refer to the liquid or pre-treated feedstock output from the hydrothermal cleaning unit or hydrothermal reactor. Further, effluent may be used interchangeably with pre-treated feedstock throughout. At the point that water and/or chemicals are added to the effluent, the effluent may be considered influent. Further, the amount of electricity utilized in a crude desalter unit and/or electrostatic precipitator may vary depending on the feedstock. For example, the amount of electricity utilized may be based on the conductivity of the effluent or pre-treated feedstock (e.g., the lower the conductivity of the effluent or pre-treated feedstock, the larger or higher amounts of electricity which may be utilized to induce separation of water and feedstock/oil). Thus, via the use of an existing crude desalter unit and/or electrostatic precipitator, more water (e.g., the contaminant-rich water) may be removed (for example, from about 1.5%, 2%, 4%, or even 6% water leftover when utilizing a large separator down to about 0.7%, 0.5%, 0.3%, or even trace amounts of water leftover when utilizing a crude desalter unit and/or electrostatic precipitator) using less space, less time, existing refinery equipment, and/or a reduced cost.

Figure 1A:
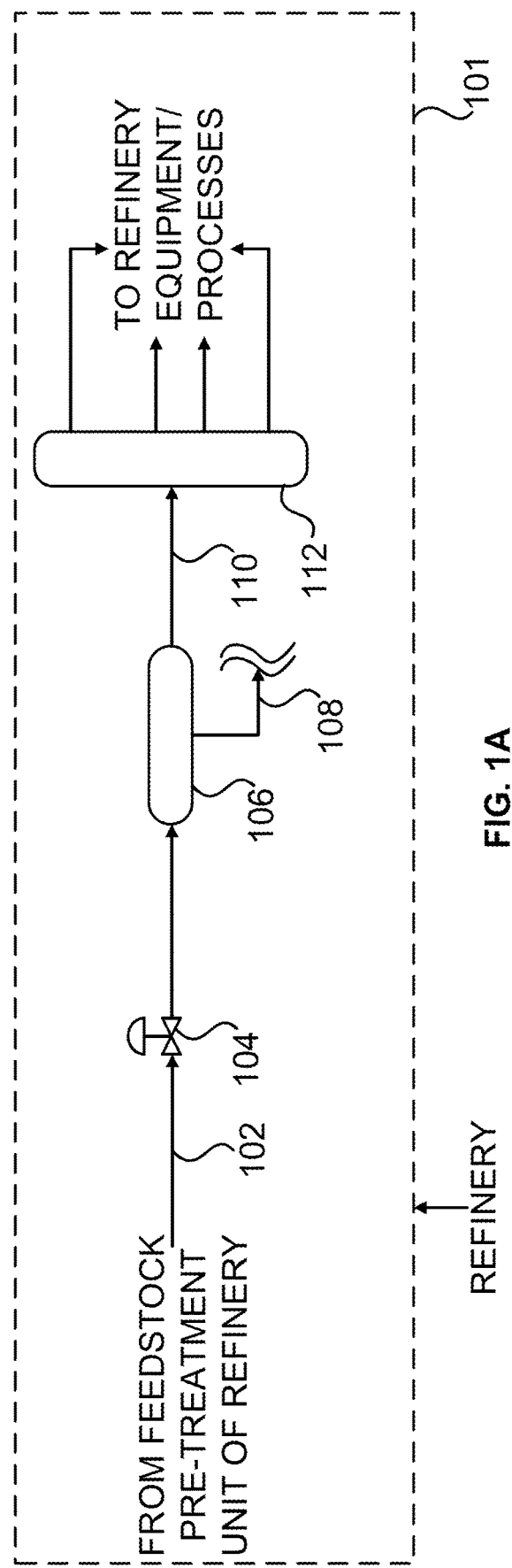

FIGS. 1A through 9E are schematic diagrams illustrating refinery systems for separating water and removing solids from a pre-treated and unfiltered feedstock, according to one or more embodiments. In such embodiments, the systems illustrated in FIGS. 1A through 9E may be a part of, included in, disposed at, or integrated into a refinery 101. In FIGS. 1A and 1B, a system is illustrated including various components. Pipeline, piping, pipes, and/or other conduit may be disposed throughout the system to convey, transfer, or transport fluids, liquids, gasses, and/or solids from one point or location within or external to the system to another point or location external to or within the system. In an example, the pipeline or piping utilized may be anti-corrosive. Due to the corrosive nature of the contaminants in the feedstock (such as free fatty acids), the pipeline or piping may utilize or be comprised of anti-corrosive material, such as stainless steel or 317L stainless steel, or include anti-corrosive coatings. Further, all or some of the components described herein (e.g., pumps, flow control valves, heat exchangers, etc.) may be comprised of anti-corrosive materials or include anti-corrosive coatings, due to the potentially corrosive nature of the feedstock. Throughout, pipeline, piping, pipe, and/or pipes may be used interchangeably.

Figure 1B:
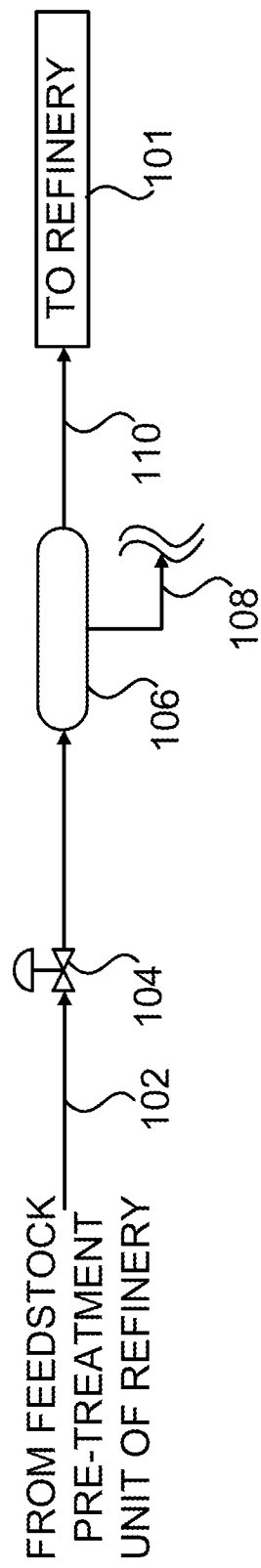

The system may include a pipeline or piping 102 for transporting effluent or pre-treated and unfiltered feedstock from a hydrothermal cleaning unit, hydrothermal reactor, and/or a reactor to a crude desalter unit 106. As noted, effluent may refer to the liquid or pre-treated feedstock output from the hydrothermal cleaning unit, hydrothermal reactor, and/or reactor. The liquid may include a blend of water and feedstock, the water including the contaminants washed from the feedstock in the hydrothermal cleaning unit, hydrothermal reactor, or reactor. The pipeline or piping 102 may connect to and be in fluid communication with a flow control valve 104. The flow control valve 104 may lower or drop the pressure of the effluent, at which point the effluent may be considered influent. The influent may refer to the pre-treated and unfiltered feedstock which may have exhibited a change or alteration (e.g., pressure drop, temperature change, added water, and/or added chemicals). The influent, with a lower pressure than the effluent, may then be transported or transferred to an electrostatic precipitation unit 106 (e.g., a crude desalter unit including an electrostatic precipitator). In such examples, the pressure of the effluent in pipeline or piping 102 may be higher than the operating pressure of the electrostatic precipitation unit 106. As such, the flow control valve 104 may lower the pressure to within the range of operating pressures of the electrostatic precipitation unit 106. The electrostatic precipitation unit 106 may separate the water from the feedstock and allow the amount of solids in the feedstock to settle to the bottom of the electrostatic precipitation unit 106. The water may be collected at a point at or along the bottom of the electrostatic precipitation unit 106 and drained from the electrostatic precipitation unit 106 for another use or for wastewater treatment at point 108. The system may be included at or integrated into a refinery 101 (e.g., as illustrated in FIG. 1A), while, in other embodiments, the system may be included at another site (e.g., the feedstock source), rather than at the refinery 101 (e.g., as illustrated in FIG. 1B). Further, when the system is located at a site separate from the refinery 101, the resulting or remaining feedstock may be transported (e.g., via pipeline or piping 110 or via transportation vehicle to a storage tank, other facility, or refinery). The remaining feedstock may be transported from the electrostatic precipitation unit 106 via pipeline or piping 110 to a distillation or fractionation column 112, a tank, to a feed drum for further transfer of feedstock to a reactor, or other component/equipment within the refinery 101.

In another embodiment, parts of the system may be located separate from a refinery 101. For example, the hydrothermal cleaning unit, hydrothermal reactor, or reactor may be located separate from the refinery 101. In such examples, the effluent or pre-treated and unfiltered feedstock may be transported to the refinery 101. In another example, the electrostatic precipitation unit 106 may be located proximal to the hydrothermal cleaning unit, hydrothermal reactor, or reactor. In such examples, the feedstock from the electrostatic precipitation unit 106 may be transported to the refinery 101. Other equipment may be located at or separate from the refinery 101. For example, a settler unit and/or a filter may be located proximal to the electrostatic precipitation unit 106 and/or the hydrothermal cleaning unit, hydrothermal reactor, or reactor.

Figure 2:
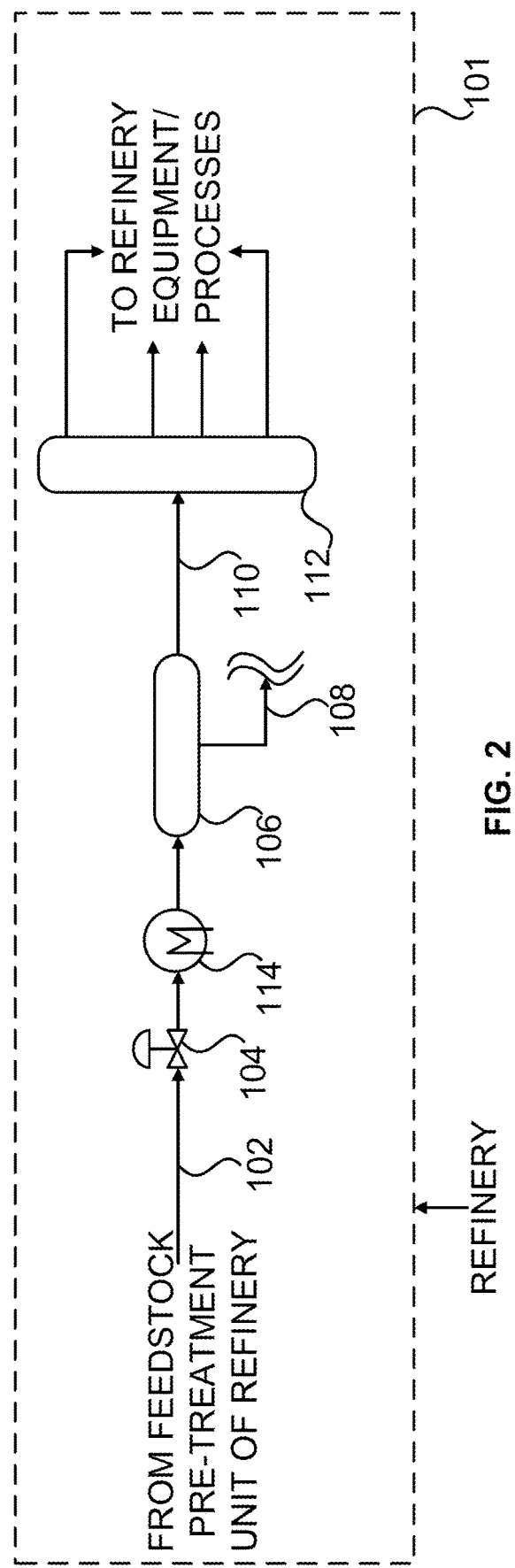

In FIG. 2, the system may include a heat exchanger 114 to heat or cool the effluent to a higher or lower temperature (at which point the effluent may be considered influent), before transportation to the electrostatic precipitation unit 106. In such examples, a sensor may be disposed at the heat exchanger 114, at the flow control valve 104, and/or at some point between the flow control valve 104 and heat exchanger 114. The heat exchanger 114 may heat or cool the effluent to a specific temperature, based on the actual temperature of the effluent as measured by the sensor. For example, if the effluent is at the operating temperature of the electrostatic precipitation unit 106 such that the water may be removed or separated from the feedstock, then the heat exchanger 114 may not heat or cool the effluent, otherwise the effluent may be heated or cooled. In other words, the effluent from a hydrothermal reactor or reactor may be sufficiently heated or cooled for use in the electrostatic precipitation unit 106. In another example, the operating temperature of the hydrothermal reactor, hydrothermal cleaning unit, or reactor may be about 465° F. to about 575° F. Further, the operating temperature of the electrostatic precipitation unit 106 (e.g., a crude desalter unit including an electrostatic precipitator) may be about 100° F. to about 300° F. In such examples, as the effluent leaves the hydrothermal reactor, hydrothermal cleaning unit, or reactor, the effluent may be at a temperature above the operating temperature of the electrostatic precipitation unit 106. Further still, the heat exchanger 114 may cool the effluent to the operating temperature. In such examples, the heat exchanger 114 may be a fin fan cooler or another type of heat exchanger to cool liquid, as will be understood by those skilled in the art.

Figure 3:
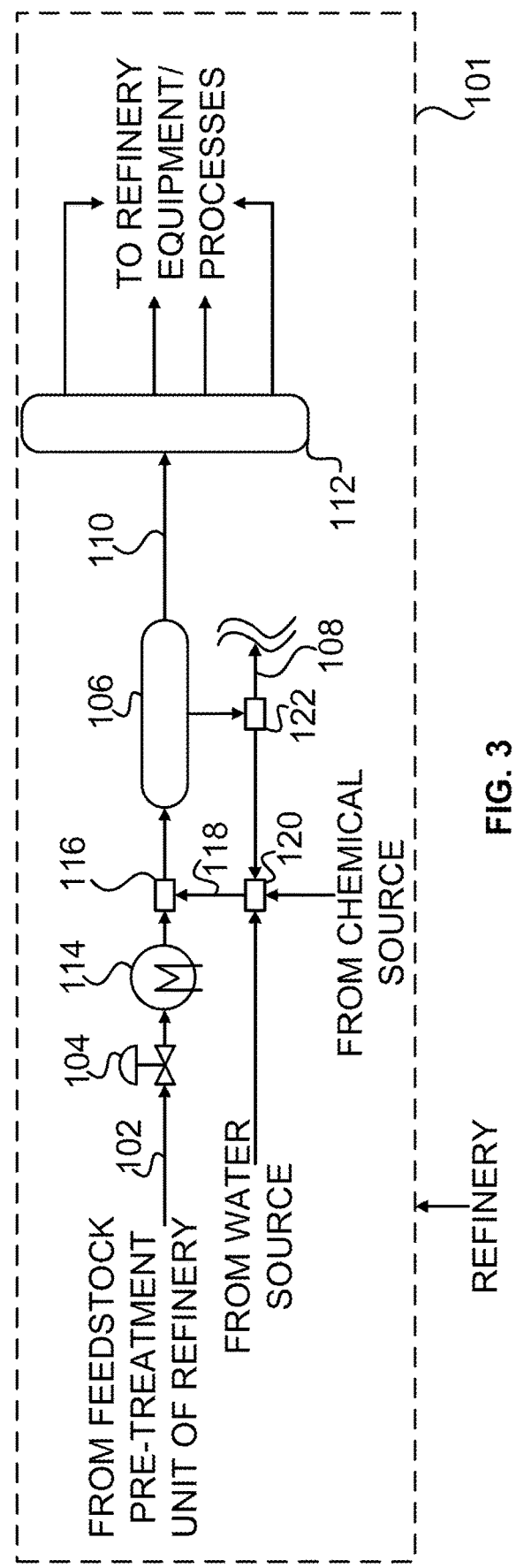

In FIG. 3, the system may include a junction or flow control valve 116 to increase the amount of water in or add chemicals to the effluent prior to entering the electrostatic precipitation unit 106. In another example, junction or flow control valve 116 may be a mixing valve or an in-line mixer to mix the effluent with other liquids, at which point the effluent may be considered influent. In another example, a separate in-line mixer may be disposed after junction or flow control valve 116 to mix any additional liquids with the effluent. A certain amount of water in comparison to the feedstock may be utilized to remove the contaminants (metals and/or salt). The amount of water utilized in the hydrothermal cleaning process may or may not be enough water for an electrostatic precipitator or crude desalting process (in particular, due to the addition of other inorganic materials other than the typical salt compounds). In such examples, more water may be added to the effluent at the junction or flow control valve 116, at which point the effluent may be considered influent. The water may be added at pipeline or piping 118, via junction or flow control valve 120, from the same water source used for the hydrothermal cleaning process or from a different source. Another source of water may be recycled water from the electrostatic precipitation unit 106, which may be added at junction or flow control valve 120 via junction or flow control valve 122. The total amount of water used in the ratio of water to feedstock may be anywhere from about 10% to about 50% of the total (e.g., about 15% water to about 85% feedstock). In another example, the amount of water in the effluent may be sufficient for the electrostatic precipitation unit 106 (e.g., the effluent may include about 10% to about 50% water).

In another example, the effluent may be completely emulsified. In such examples, an amount of chemicals (for example, demulsifiers or demulsifying agents) may be added to or injected into the effluent at junction or flow control valve 120, at which point the effluent may be considered influent. Small amounts of the chemicals may be added in or injected into the effluent to aid in the breaking of the emulsion. Such chemicals may include Truscent Ascent 840, Truscent Ascent 850, Baker Hughes Xeric 7010, and/or other demulsifying chemicals as will be understood by those skilled in the art. In another example, the chemicals may be mixed with water at junction or flow control valve 120 and then mixed with the effluent at junction or flow control valve 116. Upon separation of the influent, the chemicals may be contained in the water.

Figure 4:
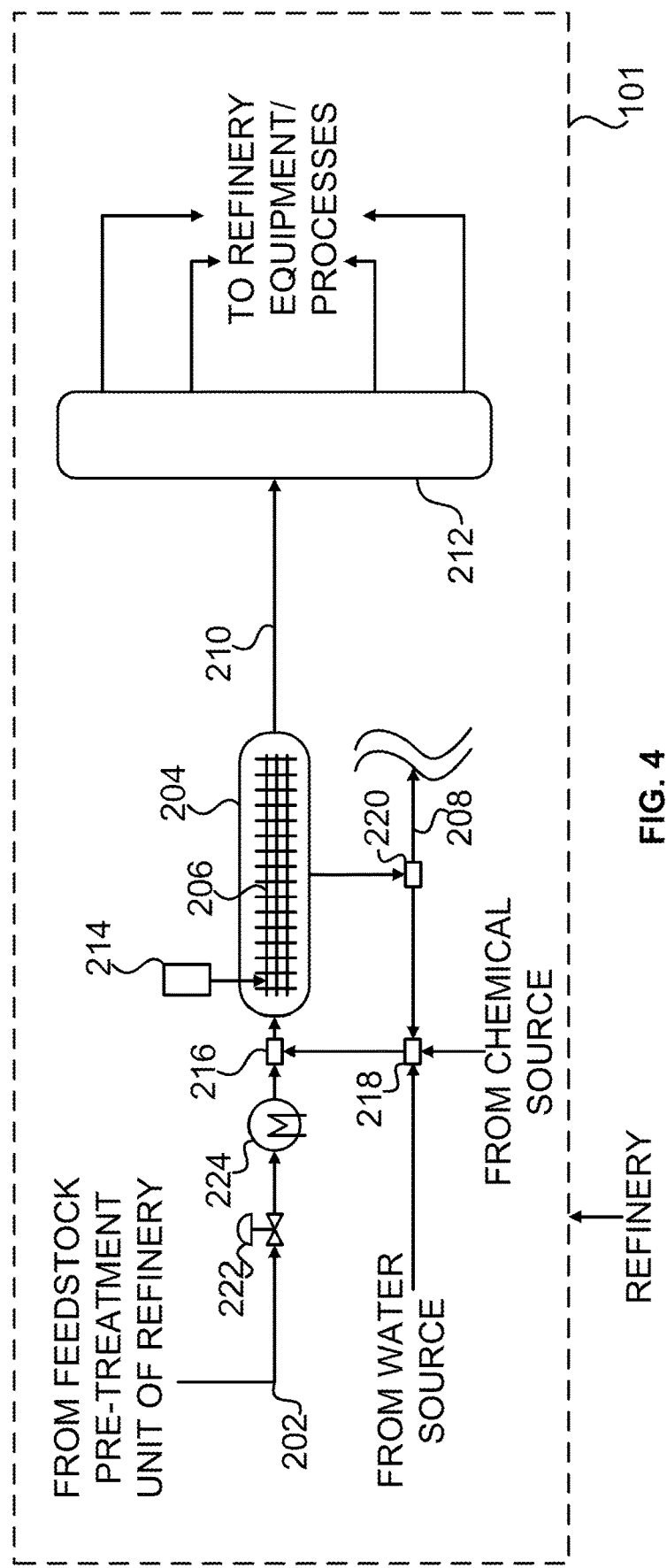

In FIG. 4, the system is illustrated with effluent or influent (which may or may not include extra water) flowing through the pipeline or piping 202 to flow control valve 222. The flow control valve 222 may decrease the pressure of the effluent or influent from a pre-treatment unit or reactor (e.g., a hydrothermal cleaning unit or hydrothermal reactor). The pressure in the pre-treatment unit and in the pipeline or piping 202 may be considerably higher than the operating pressure of an electrostatic precipitation unit 204. For example, the pressure of the effluent or influent in piping 202 may be at about 1500 pounds-force per square inch gauge (PSIG), while the operating pressure of the electrostatic precipitation unit 204 may be about 150 to 250 PSIG. As such, the system may include a flow control valve 222 to lower or drop the pressure of the effluent or influent in pipeline or piping 202. The system may also include a heat exchanger 224 to heat or cool the effluent or influent, depending on the temperature of the effluent or influent and the operating temperature of the electrostatic precipitation unit 204.

In another example, the electrostatic precipitation unit 204 may include a grid-like structure of electrodes 206. The electrodes may be connected to a power source 214. The power source 214 may provide power to the electrodes 206 (e.g., as an alternating or direct current or a voltage). The power source 214 may be a transformer to step up a voltage from the grid or another refinery 101 power source. For example, the transformer may connect to a 460-volt power source (e.g., from a utility company, the grid, an off grid power source, an off-grid power source dedicated to the refinery 101, or another refinery 101 power source). The transformer may step the voltage up to about 10,000 volts to about 30,000 volts, about 10,000 volts to about 25,000 volts, about 10,000 volts to about 20,000 volts, about 10,000 volts to about 15,000 volts, 15,000 volts to about 30,000 volts, about 15,000 volts to about 25,000 volts, about 15,000 volts to about 20,000 volts, about 20,000 volts to about 30,000 volts, about 20,000 volts to about 25,000 volts, or about 25,000 volts to about 30,000 volts, depending on the conductivity of the influent. As the influent (which may or may not include extra water and/or chemicals) is pumped into the electrostatic precipitation unit 204, power may be provided to the electrodes 206, which may create an electrostatic field within the influent. In such examples, the electrostatic field may polarize the water droplets floating in the larger volume of feedstock. The water droplets may clump together and settle near the bottom of the electrostatic precipitation unit 204. The water may then be drained off, along with solids that may have settled along the bottom of the electrostatic precipitation unit 204, at pipeline or piping 208. Further and as described throughout, the temperature of the liquid inside the electrostatic precipitation unit 204 may affect the separation of the water from the feedstock. Further still, the pressure within the electrostatic precipitation unit 204 may affect the separation of the water from the feedstock (for example, the pressure within the electrostatic precipitation unit 204, for separation, may be about 150 PSIG to about 250 PSIG). The de-contaminated or reduced-contaminant feedstock may then be transferred, via pipeline or piping 210 or transportation vehicle (e.g., a truck, rail car, or marine vessel), to a fractional distillation column 212, a tank, to another component or equipment within a refinery 101, to a refinery 101 (e.g., if the refinery 101 is separate from the equipment described herein), to a feed drum for further transfer of feedstock to a reactor, and/or for mixing with other de-contaminated feedstock.

In another example, the system may include several junctions or flow control valves to control the addition or injection of water and/or chemicals. As noted above, the junctions or flow control valves may be mixing valves or include in-line mixers. For example, the water including the contaminants may be drained from the electrostatic precipitation unit 204 to junction or flow control valve 220. Depending on whether water is to be recycled back through the system, the water may flow to junction or flow control valve 218 or via pipeline or piping 208 to be stored or treated. At junction or flow control valve 218, depending on various factors (e.g., how emulsified the effluent is or how much water the effluent contains), chemicals (e.g., demulsifying chemicals or agents), fresh water, or recycled water may be mixed and/or transported to junction or flow control valve 216 to be added into the effluent, at which point the effluent may be considered influent.

Figure 5A:
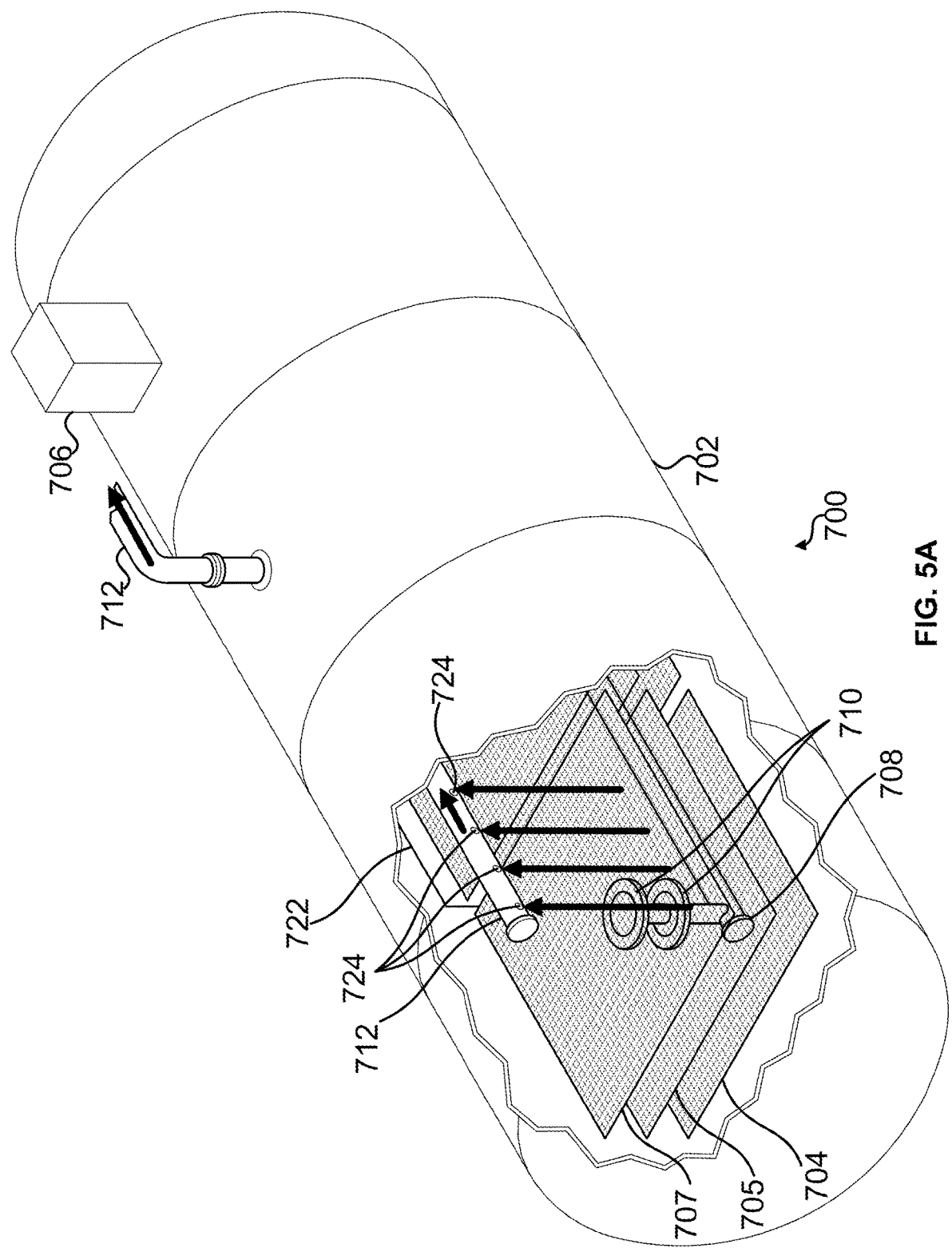
Figure 5B:
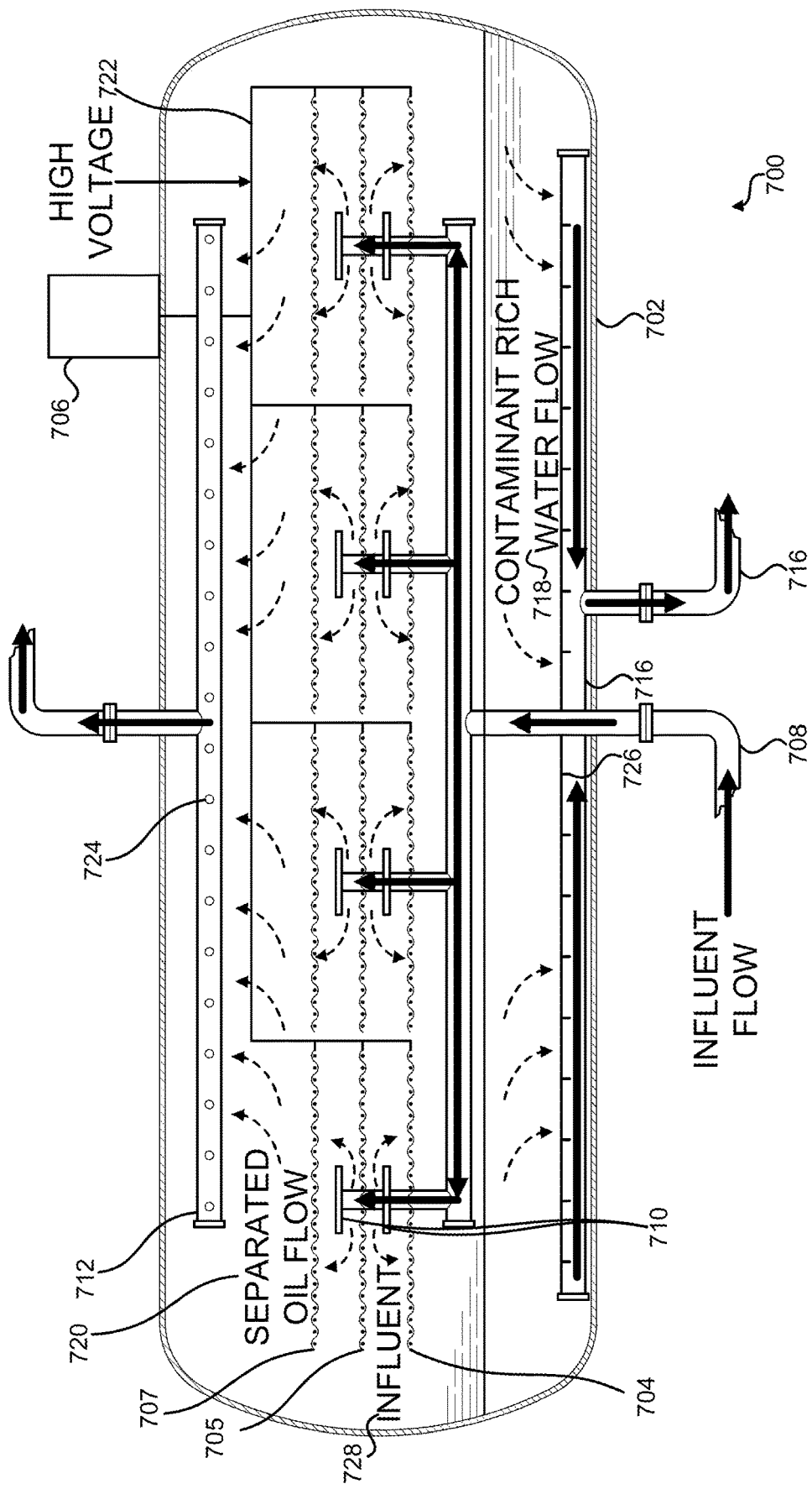
Figure 5C:
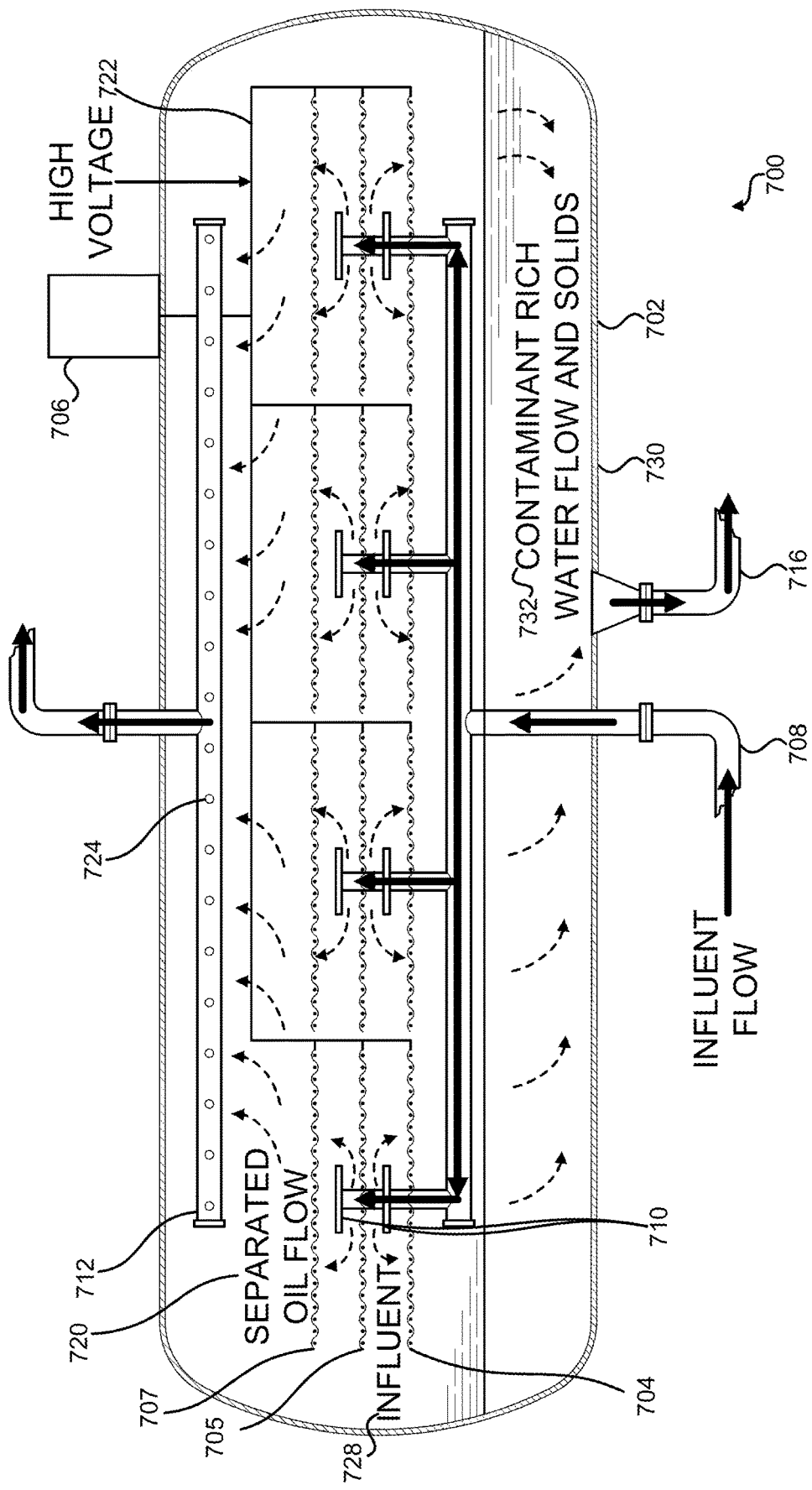

An example of an electrostatic precipitation unit 700 is illustrated in FIGS. 5A, 5B, and 5C. In an example, the electrostatic precipitation unit 700 may include a vessel 702 or enclosure to hold influent 728 or any other type of oil/water mixture (e.g., a pre-treated feedstock which may or may not include additional water and/or chemicals). Disposed within the vessel 702 may be several layers of electrodes 704, 705, 707 (e.g., a bottom layer of electrodes 704, a middle layer of electrodes 705, and a top layer of electrodes 707). The electrodes 704, 705, 707 may connect to a transformer 706 via insulated cable 722. The insulated cable 722 may be insulated to prevent or reduce risk of electrocution, short circuit, and/or arc faults. The transformer 706 may connect to an external power source, as noted above. In other words, the transformer 706 may transfer or provide power or a high voltage to the electrodes 704, 705, 707. The power or high voltage may be about 10,000 volts to about 30,000 volts, about 10,000 volts to about 25,000 volts, about 10,000 volts to about 20,000 volts, about 10,000 volts to about 15,000 volts, 15,000 volts to about 30,000 volts, about 15,000 volts to about 25,000 volts, about 15,000 volts to about 20,000 volts, about 20,000 volts to about 30,000 volts, about 20,000 volts to about 25,000 volts, or about 25,000 volts to about 30,000 volts.

The electrostatic precipitation unit 700 may include various pipelines or piping to receive an influent flow and transport separated oil 720 and separated contaminant rich water 718. For example, a pipeline or piping 708 may pass through the bottom of the electrostatic precipitation unit 700 to provide an influent flow to the electrostatic precipitation unit 700. The influent flow may flow through pipeline or piping 708 to flanges 710. The flanges 710 may include apertures or openings to allow the influent 728 (e.g., the influent comprised of effluent from a hydrothermal reactor and/or including additional water and/or chemicals) to pass, flow, or spray through the to the inside of the vessel 702. The influent 728 may pass, flow, or spray through the apertures or openings and contact the electrodes 704, 705, 707. In such examples, the electrodes 704, 705, 707 may create an electrostatic field via the voltage provided by the transformer 706 via insulated cables 722. The electrostatic field created by the electrodes 704, 705, 707 may induce polarization of the contaminant rich water 718 inside the influent 728 causing the influent 728 to separate into the contaminant rich water 718 and oil 720 (e.g., the de-contaminated or reduced contaminant feedstock). The contaminant rich water 718 may then collect, clump, settle, or pool at the bottom of the vessel 702 and drain through notches, openings, or apertures 726 in pipeline or piping 716, while the separated oil 720 may pass through openings or apertures 724 in pipeline or piping 712. In an example, the process of separating the oil 720 (e.g., feedstock) from the contaminant rich water 718 in the influent 728 may be performed in about 10 minutes to about 60 minutes or about 10 minutes to about 30 minutes. The pipeline or piping 712 may transport the oil 720 to other refinery processes and/or equipment. The pipeline or piping 716 may transport the contaminant rich water 718 to a junction or flow control valve for re-use in the electrostatic precipitation unit 700 or in other refinery processes or for treatment at a wastewater treatment unit or facility (e.g., at or separate from the refinery). In another embodiment, the equipment described herein may be located at a site or facility different than that of the refinery 101. In such examples, the resulting product of the electrostatic precipitator 324 may be output to a refinery 101 or one or more storage tanks.

In an example, the influent 728 may include solids. The solids may be included in the feedstock and may flow through the system until reaching the electrostatic precipitation unit 700. In other words, the feedstock, from a feedstock source may include an amount of solids. The solids, in some examples, may be removed via a settler unit or filter prior to being transferred to the hydrothermal reactor. In another example, no filter or settler may be utilized, to reduce costs. Thus, the solids may flow through to the hydrothermal reactor and, ultimately, to the electrostatic precipitation unit 700. The solids may include leftover material feedstock processing (e.g., agricultural byproducts, such as leftover animal or plant materials). Such solids may cause issues in refining equipment, if not removed. In such examples, the solids may flow with the influent 728 to the electrostatic precipitation unit 700. Further, the electrostatic precipitation unit 700 may be configured to function as a settler or solids removal system, in addition to the other functions described herein. The electrostatic precipitation unit 700 may include a floor, base, or bottom portion 730. The floor, base, or bottom portion 730 may be angled or slope towards pipeline or piping 716. The influent 728 may be stored in the electrostatic precipitation unit 700 for a sufficient period of time (e.g., residence time) to allow for separation of contaminant rich water and solids 732 from feedstock or oil. In an example, the residence time for the water to separate from the oil may be sufficient for the solids to settle along the floor, base, or bottom portion 730. As illustrated in FIG. 5C, the contaminant rich water and solids 732 may flow through the pipeline or piping 716. The contaminant rich water and solids 732 may flow to a wastewater treatment unit or facility for removal of the contaminants and solids. Thus, solids may be removed from feedstock using existing equipment and at low cost.

Figure 6:
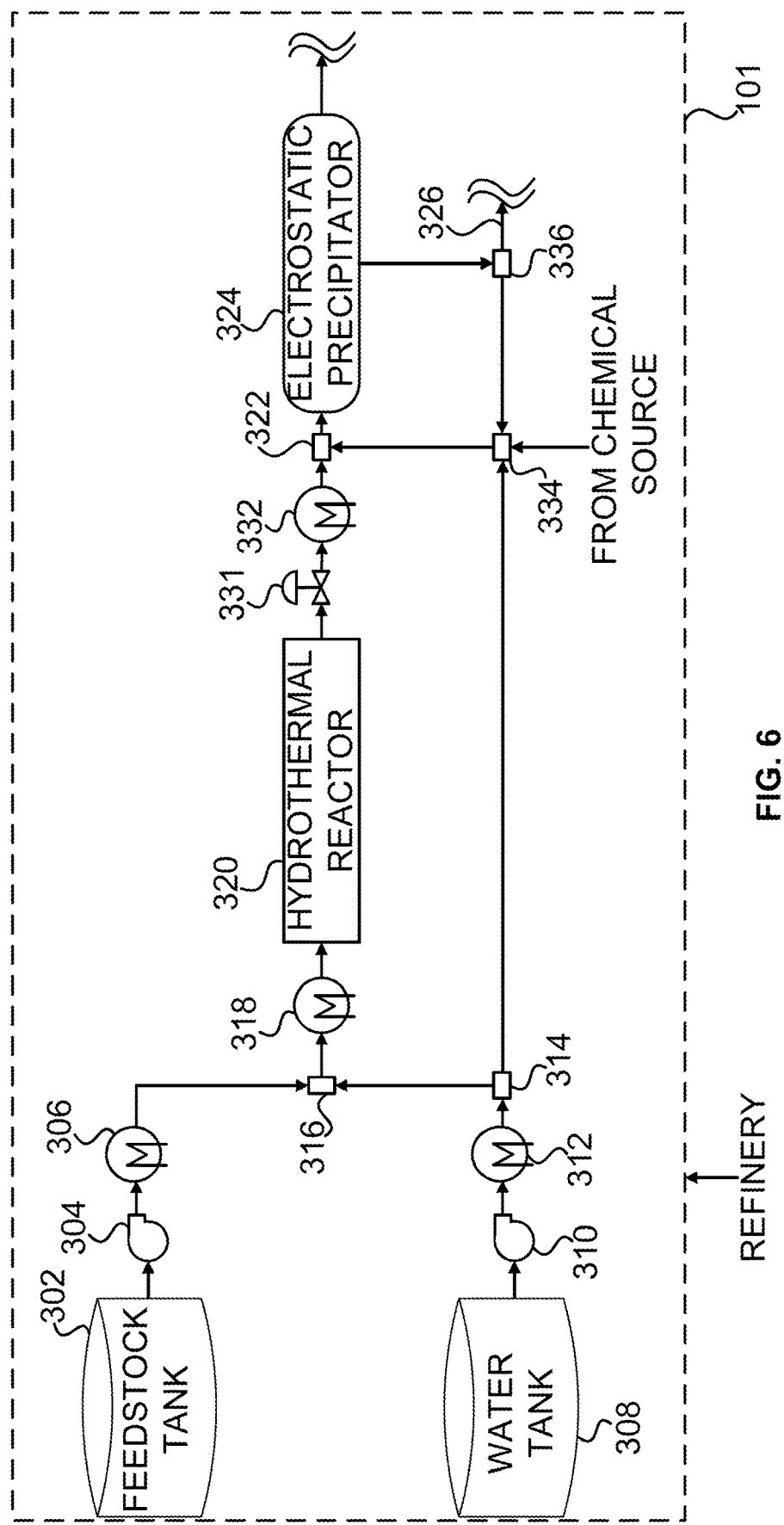

In FIG. 6, the system may include two or more tanks. The system may include a feedstock tank 302 (or other source of feedstock), a water tank 308 (or other water source), other tanks to store other feedstock and/or additional water, and/or connections to feedstock and/or water sources. The system may further include a connection to another water source.

Each tank may connect to a pump 304, 310 and/or a heat exchanger 306, 312. The pumps 304, 310 may increase the pressure of the feedstock and/or water to the operating pressure of the hydrothermal reactor 320. In another example, the water may be injected into the feedstock (for example, at junction or flow control valve 316) and then passed to a pump and/or heat exchanger 318. In such examples, the blended feedstock and water, the feedstock, and/or the oil may be heated, via the heat exchanger 306, 312, 318 to a temperature sufficient for the water to absorb the metals, phosphorous, and/or other contaminants. In such examples, the blend or each portion of the blend (i.e., the water and/or feedstock) may be heated to about 465° F. to about 575° F.

In another example, the heated blend of feedstock and water may be passed to the hydrothermal reactor 320. In such examples, the hydrothermal reactor 320 may be comprised of a long tube-like structure to provide sufficient residence time (e.g., about 30 seconds to 5 minutes) at the sufficient temperature to wash the contaminants from the feedstock into the water. In an example, such a process may utilize about 10% to about 50% water (the amount of water relative to the total amount of water and feedstock). For example, to process approximately 40 thousand barrels of oil per day (MBD) of feedstock the hydrothermal reactor 320 may utilize approximately 12 MBD of water or 350 gallons per minute (GPM) of water.

Once the contaminants have been washed from the feedstock into the water, the blend of feedstock and water may be transported to a flow control valve 331 to decrease the pressure of the blend. The blend may further be transported to a heat exchanger 332 to reduce or increase the temperature of the blend (based on the temperature of the blend). From the heat exchanger 332, the blend may be transported to the electrostatic precipitation unit 324. In another example, the amount of water in the blend or mix of feedstock and water may not include an amount of water sufficient to separate the water from the feedstock via the electrostatic precipitation unit 324. In such examples, extra or additional fresh water from the water tank 308 or recycled water drained from the electrostatic precipitation unit 324 may be added, via junctions or flow control valves 322, 334, 336, to the blend. The blend or combined blend and water may be transported to the electrostatic precipitation unit 324, where all or most of the water (for example, all but about 0.7%, about 0.5%, about 0.3%, or even trace amounts of the water) may be separated in a short period of time (e.g., about 10 minutes to about 60 minutes or about 10 minutes to about 30 minutes). The water containing the contaminants may be transported, via pipeline or piping 326 from the electrostatic precipitation unit 324, while the feedstock may be transported to a tank, a refinery process or component, a fractional distillation column, to a point where the feedstock may be combined with another feedstock, to a feed drum for further transfer of feedstock to a reactor, to a refinery (e.g., refinery 101 or another refinery), and/or other points or locations within or external to the refinery 101, e.g., for processing through various refinery operations.

Figure 7:
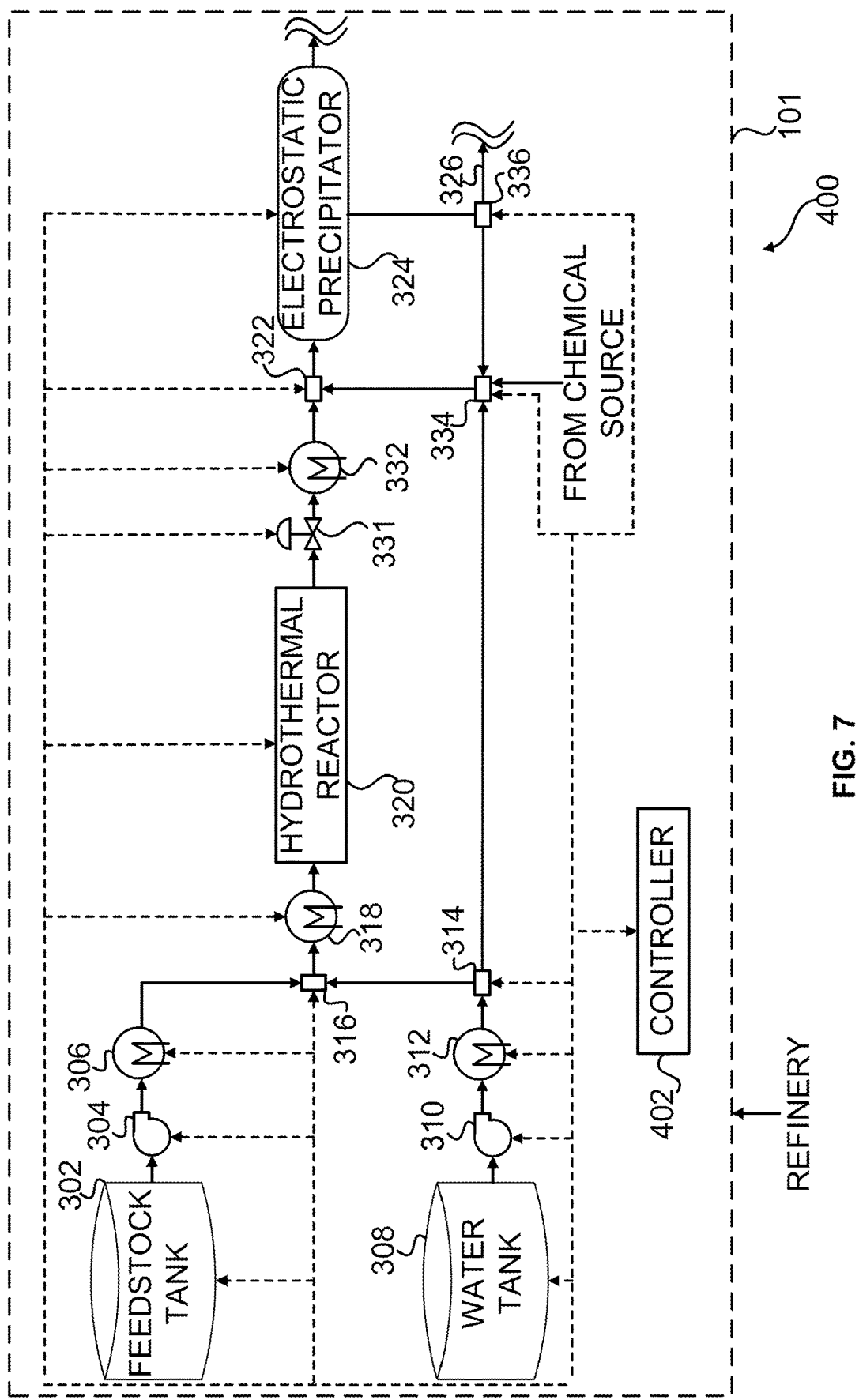

As illustrated in FIG. 7, the system may include a controller 402. The controller 402 may connect to or be in signal communication with various different sensors, other controllers, meters, or components in the refinery 101. In another example, the controller 402 may be a refinery controller and may include instructions, in addition to the instructions described below, to control various refinery processes and/or equipment. The controller 402 may include memory and one or more processors. The memory may store instructions executable by the one or more processors. In an example, the memory may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor 1002. As used herein, a "processor" may include, for example one processor or multiple processors included in a single device or distributed across multiple computing devices. The processor 1002 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In such examples, the controller 402 may determine whether to and/or to what temperature the feedstock, water, and/or effluent may be heated or cooled. The controller 402 may make such determinations based on the type of feedstock, the initial temperature of the feedstock, the initial temperature of the water, the temperature of the effluent exiting the hydrothermal reactor 320, and/or the temperature of water to be added to the effluent. Such data may be provided via sensors disposed throughout the system 400.

In another example, the controller 402 may determine the amount of water to add to the effluent from the hydrothermal reactor 320 based on the amount of effluent from the hydrothermal reactor 320 and the amount of water initially added to the feedstock at junction or flow control valve 316. The controller 402 may further determine the length of time or residence time (in other words, the time interval) that the combined water and feedstock may reside in the hydrothermal reactor 320 and the length of time or residence time (in other words, the time interval) that the influent (with or without extra water) may reside in the electrostatic precipitation unit 324. The length of time or residence time that the influent may reside in the electrostatic precipitation unit 324 may be based on an amount or estimated amount of solids in the influent. For example, if the influent includes a large amount of solids, residence time may be increased to allow for settling. While, if the influent does not include a large amount of solids, residence time may be decreased. Further, the controller 402 may estimate the amount of solids in an influent based on the type of feedstock. Further, the controller 402 may determine the temperature at which the combined water and feedstock may be heated to while residing in the hydrothermal reactor 320 and the temperature at which the effluent may be heated or cooled to prior to entering the electrostatic precipitation unit 324.

In another example, the controller 402 may determine the pressure drop for the effluent entering the electrostatic precipitation unit 324. The effluent exiting the hydrothermal reactor 320 may be at a pressure greater than the operating pressure of the electrostatic precipitation unit 324. As such, the controller 402 may determine adjustments for the flow control valve 331 to lower or drop the pressure of the effluent to within a range of operating pressures of the electrostatic precipitation unit 324. In an example, a pressure sensor may be disposed at the output of the hydrothermal reactor 320, at the flow control valve 331, or at some point in between. The pressure sensor may provide the pressure of the effluent to the controller 402. The controller 402 may utilize such data to adjust the flow control valve 331, thus adjusting the pressure to within the proper range of the operating pressure of the electrostatic precipitation unit 324.

Figure 8:
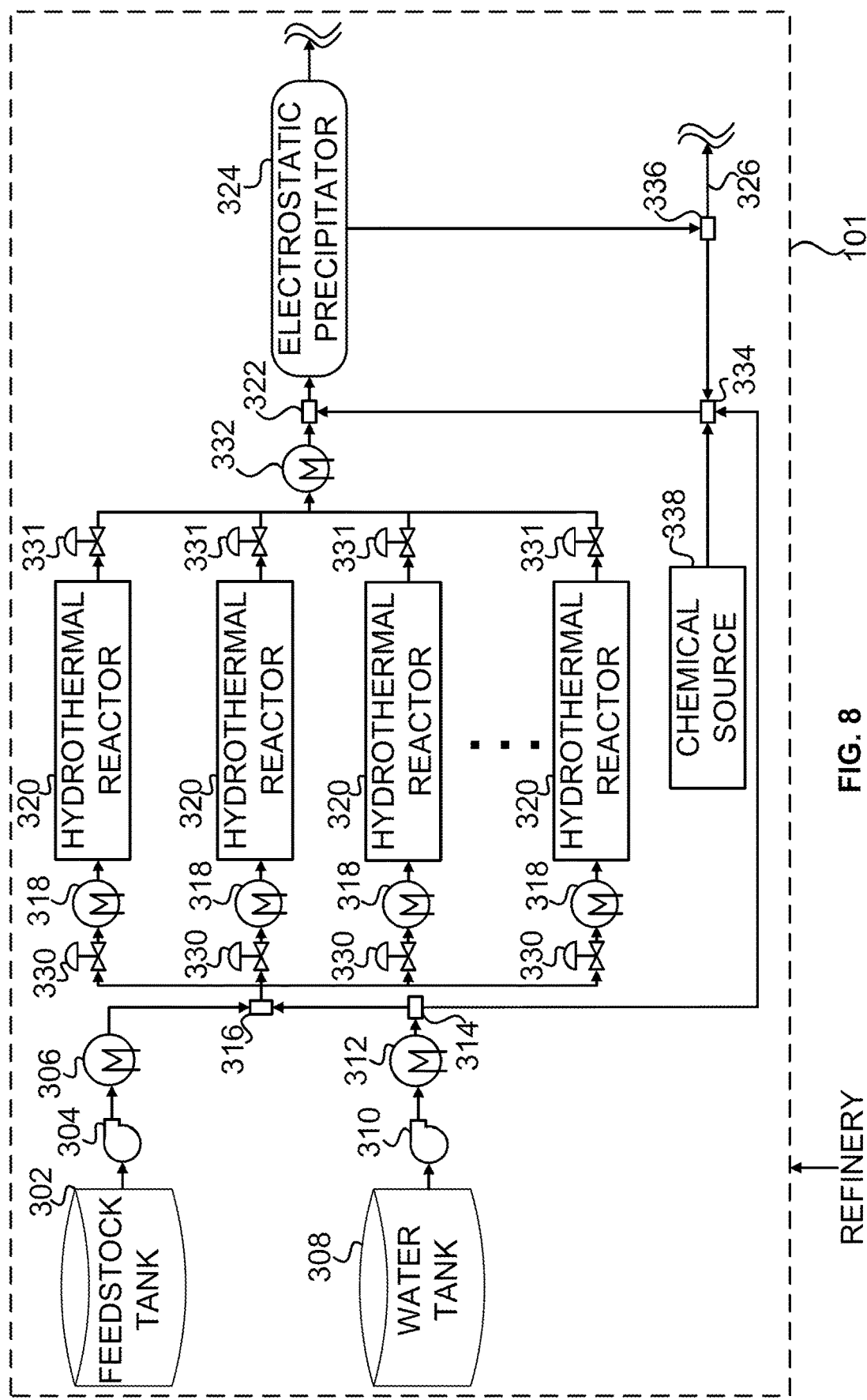

As illustrated in FIG. 8, multiple hydrothermal reactors 320 may be utilized in parallel. In such examples, flow control valves 330 may enable which hydrothermal reactor 320 may be utilized at any particular time. For example, one hydrothermal reactor 320 may be utilized for a first process, while another may be utilized for a following process. In another example, several hydrothermal reactors 320 may be taken offline for maintenance, while the rest may be utilized for further processes during such maintenance.

As noted above, demulsifying agents may be utilized in an electrostatic precipitation unit 324. Such demulsifying agents may be from a chemical source 338. The chemical source 338 may be a tank storing the demulsifying agents or another type of storage to store such demulsifying agents, as will be understood by those skilled in the art.

As illustrated in FIGS. 9A through 9E, system 401 may include one or more oil-water separators (e.g., a crude desalter unit utilizing demulsifying agents, a crude desalter unit utilizing an electrostatic precipitator, an electrostatic precipitation unit, an oil-water separator including an electrostatic precipitator, or other type of separator). Rather than using the large separator as described above, a smaller first oil-water separator 408 (e.g., a small Stokes Law separator, a crude desalter unit utilizing demulsifying agents, a crude desalter unit utilizing an electrostatic precipitator, an electrostatic precipitation unit, an oil-water separator including an electrostatic precipitator, or other type of separator) may be utilized in conjunction with and/or in series with the second oil-water separator 412 (e.g., a crude desalter unit utilizing demulsifying agents, a crude desalter unit utilizing an electrostatic precipitator, an electrostatic precipitation unit, an oil-water separator including an electrostatic precipitator, or other type of separator). For example, as described above, a feedstock source 404 may be a renewable feedstock or other feedstock including contaminants (metal, phosphorus, and/or other contaminants). Feedstock from the feedstock source 404 may be mixed with water from a water source 406 (e.g., from a tank, pond, utility provider (via pipeline or piping), and/or other location including fresh water).

Figure 9A:
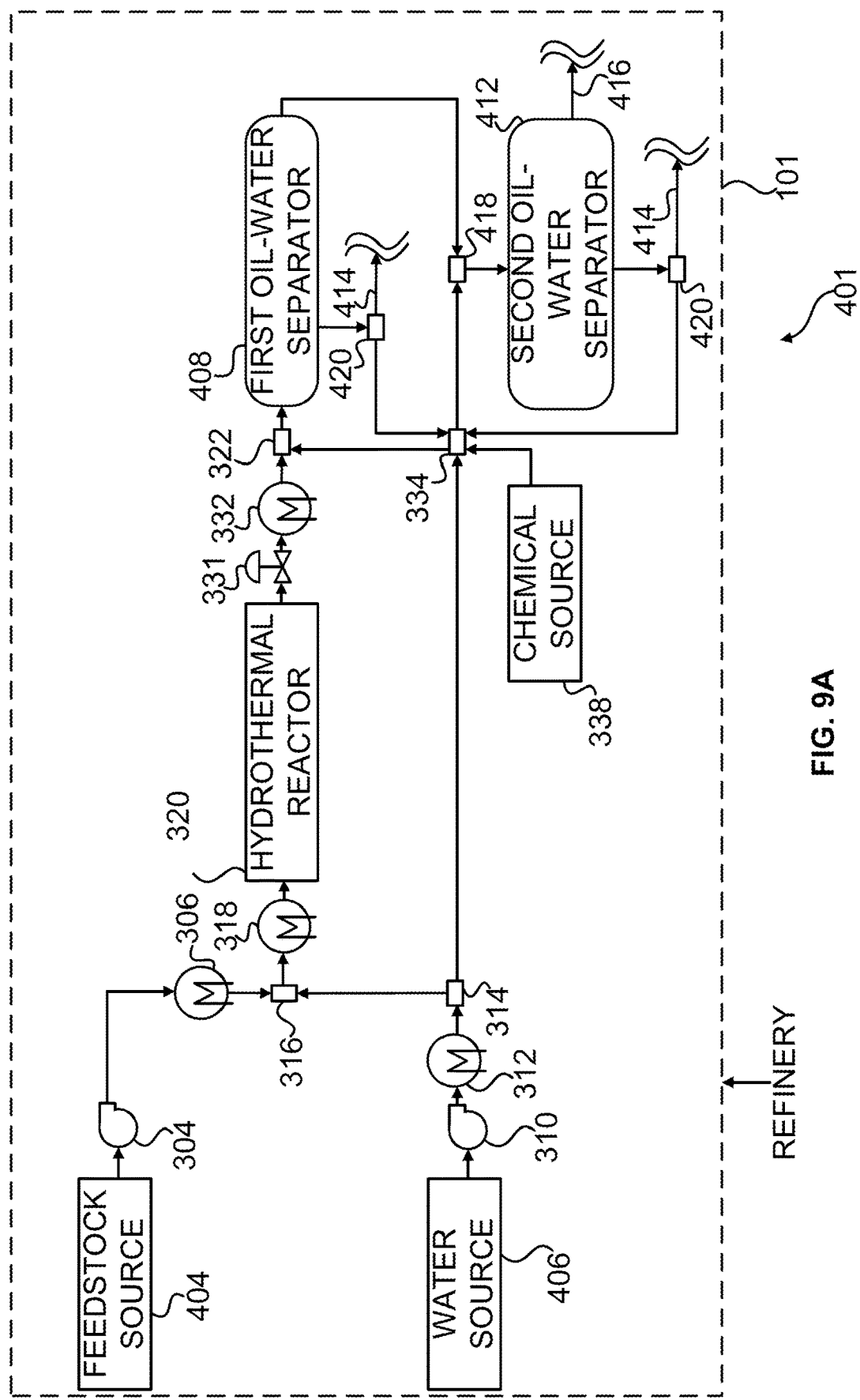

In an example, the system 401, as illustrated in FIG. 9A, may not include a filter or settler unit. In such examples, any solids included in feedstock from the feedstock source 404 may be separated out in the first oil-water separator 408 and/or the second oil-water separator 412. In other words, any solids in the feedstock may settle and be removed with the contaminant rich water at pipeline or piping 414 for disposal or treatment. Such configurations may further reduce or maintain costs as filters may be expensive and not typical at this point in the refinery 101.

Figure 9B:
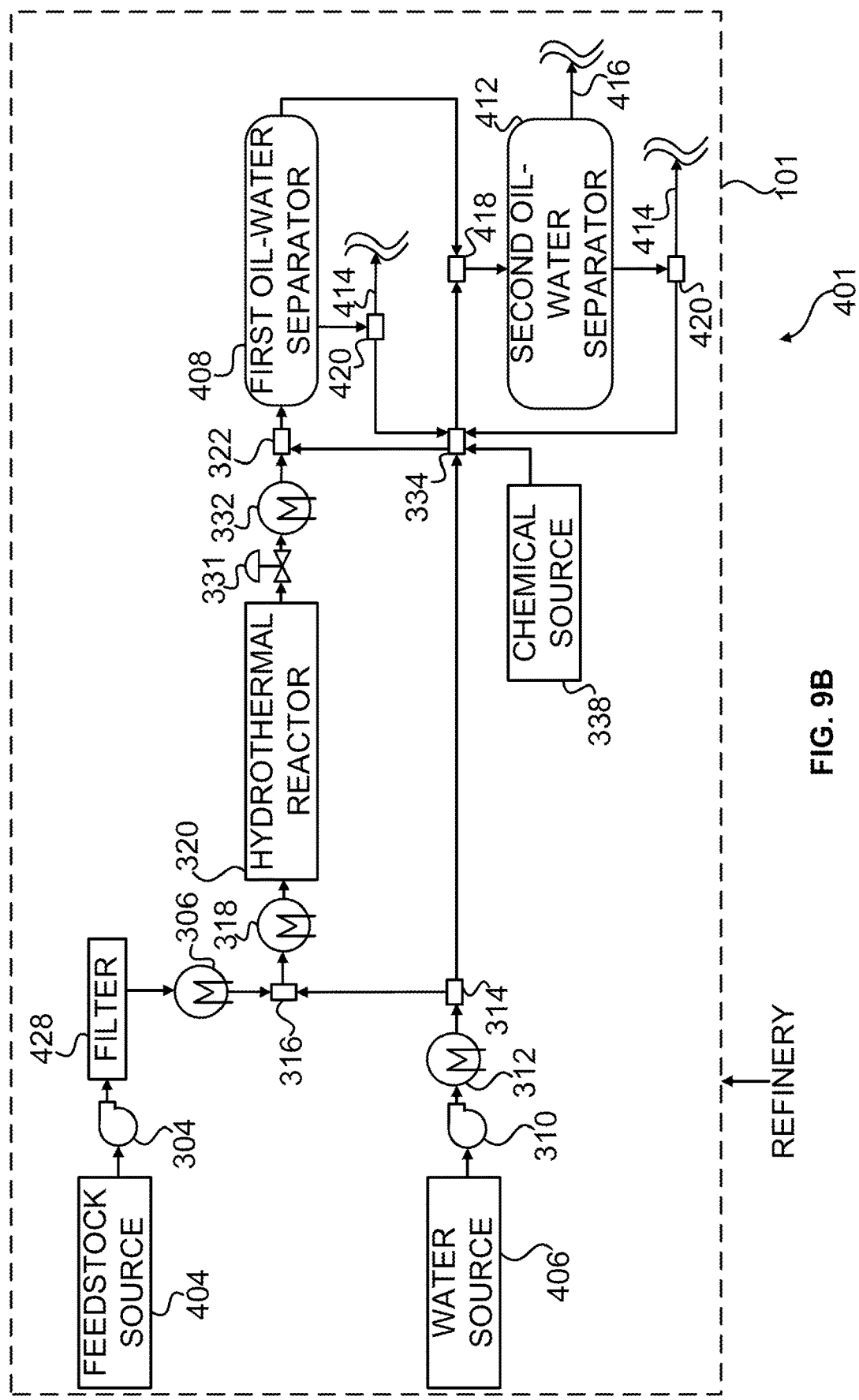
Figure 9C:
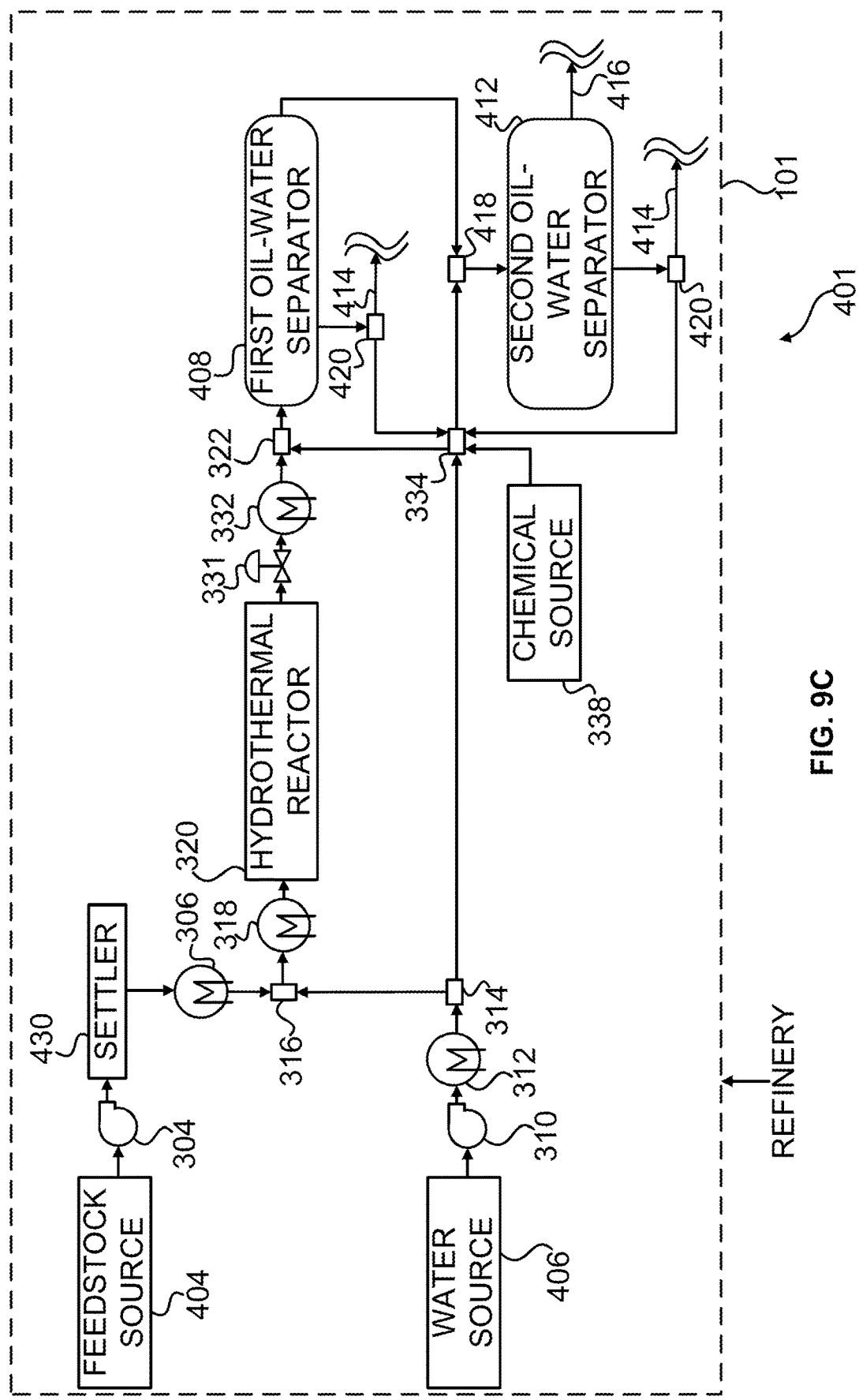
Figure 9D:
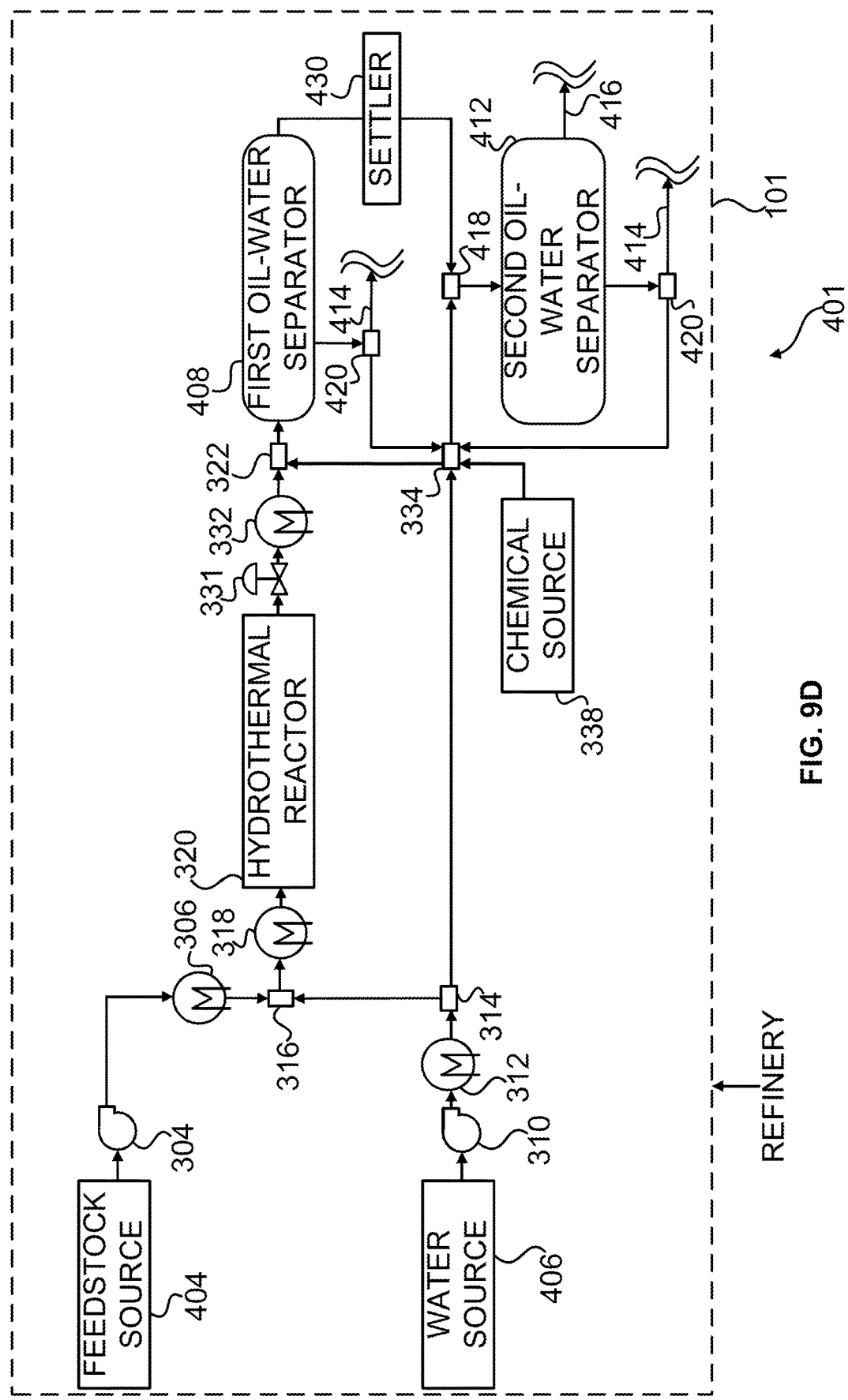
Figure 9E:
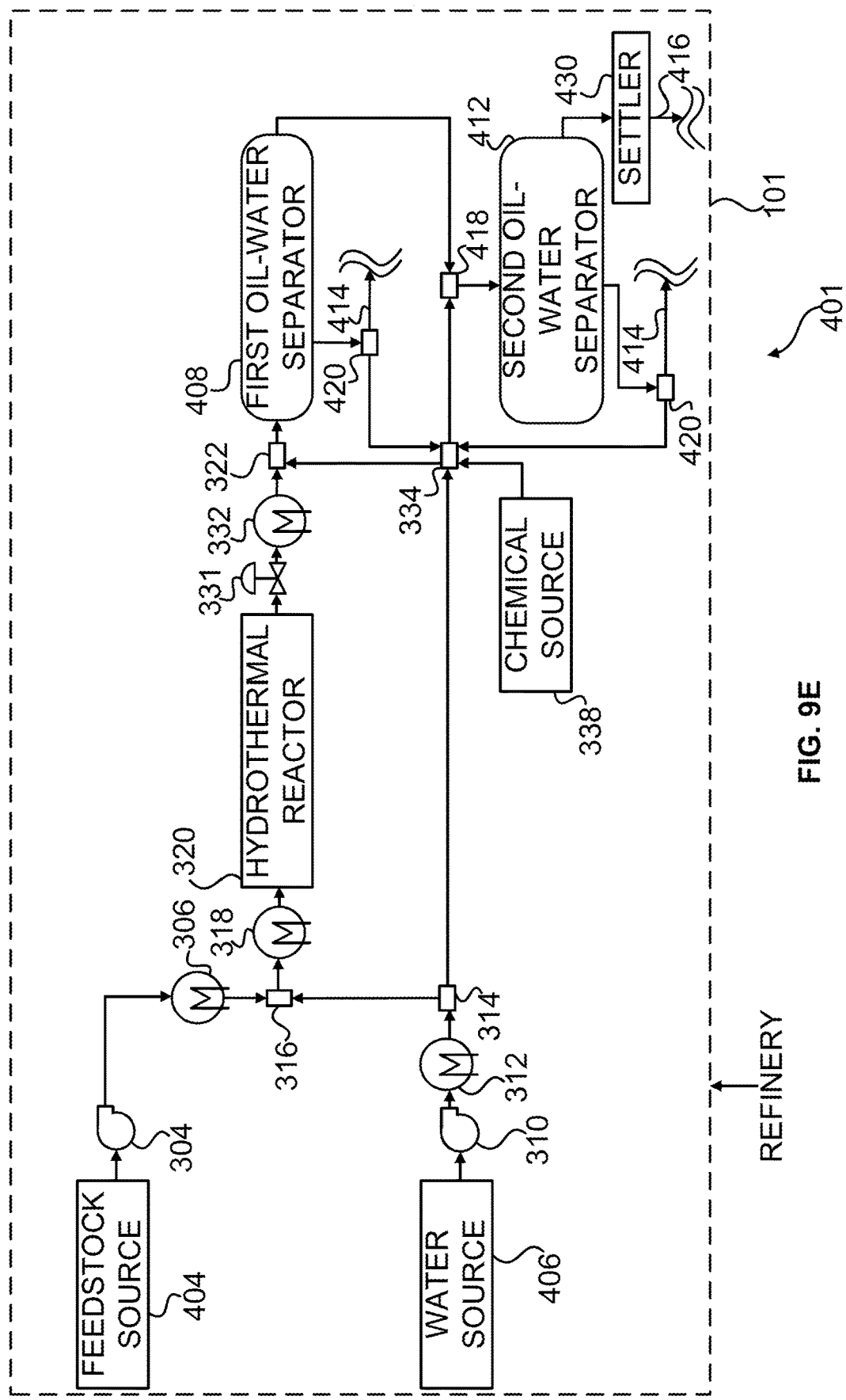

Prior to heating via heat exchanger 306, as illustrated in FIG. 9B, the feedstock may pass through a filter 428. The filter 428 may filter out any solids in the feedstock from the feedstock source 404. In such examples, the filter 404 may be a mesh filter, a basket filter, or another type of filter suitable for removing solids from a liquid as will be understood by those skilled in the art. For example, the feedstock may pass through a mesh filter prior to entering the pump 304 or the heat exchanger 306. The mesh filter may be a 5-micron to 50-micron mesh filter (e.g., filter 404 may be a 10-micron mesh filter). The filter 428 may be disposed at other locations in the system 401. For example, after the hydrothermal reactor 320, after the first oil-water separator 408, after the second oil-water separator 412, or at another point in the system 401.

In another example, the system 401 may include a settler or settler unit 430. The settler unit 430 may be configured to allow the solids to separate from the feedstock over time. The settler 430 may be a tank, other vessel, or other structure to allow for separation of the feedstock from solids. In an example, the settler 430 may be a feedstock tank. As the feedstock enters the system 401, the feedstock may be stored in a tank or feedstock tank. As the time the feedstock is stored in the feedstock tank increases, the solids may start to separate and may be removed. In another example, each oil-water separator (e.g., first oil-water separator 408 and second oil-water separator 412) may include a settler unit or the functionality of the setter unit. In another example, one or more settler units may be disposed throughout the system 401 and at various points in the system 401 (e.g., prior to heating and before entry into the hydrothermal reactor, prior to entering the first oil-water separator 408, after the first oil-water separator 408, and/or after the second oil-water separator 412. In such examples, the solids may be considered to be separated from the feedstock upstream of the refinery 101.

The feedstock source 404 and/or water source 406 may be heated prior to mixing, via heat exchanger 308 and/or heat exchanger 312, respectively, or may be heated after mixing via, heat exchanger 318. In another example, the mixture may be heated in the hydrothermal reactor 320. The heated mixture may undergo a hydrothermal reaction within the hydrothermal reactor 320 based on the temperature, pressure, flow or counter-current, and/or time in the hydrothermal reactor 320. In other words, the contaminants in the feedstock may be washed into the water.

Once the mixture has undergone the hydrothermal reaction, the mixture may be transported to the first oil-water separator 408. As noted, the first oil-water separator 408 may be a Stokes law separator, a crude desalter unit utilizing demulsifying agents, a crude desalter unit utilizing an electrostatic precipitator, an electrostatic precipitation unit, an oil-water separator including an electrostatic precipitator, or other type of separator. In an example, the separator may be a tank to store the mixture for a period of time. During the period of time, the oil or feedstock may separate and a skimmer may separate and transport the oil to junction or flow control valve 418. The remaining water may be drained and/or transported via pipeline or piping 410 for disposal, re-use, or treatment or transported for re-use at junction or flow control valve 334. In such examples, the feedstock, after undergoing the hydrothermal reaction, may still include about 1.5%, about 2%, about 4%, or even about 6% of water (e.g., contaminant-rich water). Further, any solids in the feedstock may settle during the described period of time.

The feedstock from the first oil-water separator 408 may be transported to junction or flow control valve 418. At junction or flow control valve 418 additional water (e.g., fresh water from water source 406, recycled water from the first oil-water separator 408, and/or second oil-water separator 412) and/or chemicals (e.g., demulsifying chemicals) from chemical source 338 may be mixed with the feedstock. In such examples, the amount of water added may be about 1% to about 10% of the total of the mixture of the additional fresh water and feedstock (e.g., the feedstock which may still include about 1.5%, about 2%, about 4%, or even about 6% of contaminant-rich water).

During the residence time of the mixture in the first oil-water separator, the mixture may cool. As such, another heat exchanger may be disposed in the system 401 to heat or cool the feedstock transported from the first oil-water separator 408, to heat or cool the additional fresh water, and/or to heat the mixture of the additional fresh water and feedstock from the first oil-water separator 408 prior to entering the second oil-water separator.

Once the new mixture of feedstock and additional fresh water have been heated or cooled to the proper temperature (e.g., for a crude desalter unit about 100° F. to about 300° F.), the new mixture may be transported to the second oil-water separator 412 (e.g., a secondary oil-water separator unit and/or a crude desalter unit). In the second oil-water separator 412 all or a substantial portion of the water may be removed from the mixture. For example, all but about 0.7%, about 0.5% or even about 0.3% of the water may be removed from the mixture. The water removed may include the contaminants or a portion of the contaminants leftover from the first oil-water separator 408. The water may be transported from the second oil-water separator 412 via pipeline or piping 414 for disposal, re-use, or treatment or via junction or flow control valve 420 for re-use in the first oil-water separator 408 and/or second oil water separator 412. The feedstock, which may be free of or substantially free of contaminants, i.e., a reduced-contaminant feedstock, may be transported via pipeline or piping 416 to various refinery equipment, such as a fractionation column or distillation tower.

FIG. 10 is a simplified diagram illustrating a control system or system 500 for managing the separation of water from a pre-treated feedstock, according to an embodiment. As noted above, the controller 502 may include memory 506 and a processor 504 (or one or more processors). The memory 506 may store instructions and the instructions may be executable by the processor 504. The instructions may include instructions 508 to control the various valves, flow control valves, or other components (e.g., water control valve 518 and/or feedstock control valve 520) to control or adjust ratios and/or pressure of water and feedstock transported to a hydrothermal cleaning unit 532 (also referred to as a HCU or hydrothermal reactor). The controller 502 may also control the amount of water to mix with effluent from the hydrothermal cleaning unit. The controller 502 may also connect to and control an effluent flow control valve disposed between an HCU and electrostatic precipitation unit. The controller 502 may determine the pressure of the effluent and, based on the pressure of the effluent and the operating pressure of the electrostatic precipitator, the controller 502 may lower the pressure via the effluent flow control valve.

The controller 502 may also include instructions 510 to control pumps disposed throughout the system 500. For example, the system 500 may include a water pump 522 to control, via signals from the controller 502, the flow of water throughout the system 500 and/or a feedstock pump 524 to control, via signals from the controller 502, the flow of feedstock throughout the system 500. In such examples, the controller 502 may determine the amount of water to mix with feedstock and/or the amount of water to mix with effluent from the hydrothermal cleaning unit, based on various factors, such as type of feedstock, estimated or actual amount of contaminants in the effluent, operating temperature, and/or operating power.

The controller 502 may also include instructions 512 to control heat exchangers disposed throughout the system 500. For example, the system 500 may include a feedstock heat exchanger 526, a water heat exchanger 528, and/or an effluent heat exchanger 530. The controller 502 may control each of the heat exchangers based on the operating temperature for each process in the system 500. For example, the hydrothermal cleaning unit 532 may operate at temperatures between 465° F. and 575° F. Thus the controller 502 may determine (for example, via sensors or other devices disposed throughout the system 500) the temperature of a liquid and, based on the process to be performed and an operating temperature, may send a signal to a heat exchanger to heat the liquid to the proper temperature. In other examples, the system 500 may or may not include an effluent heat exchanger 530. In such examples, the effluent may be heated or cooled to a sufficient level as the effluent is transported from the hydrothermal cleaning unit 532.

The controller 502 may include instructions 514 to control the hydrothermal cleaning unit 532 and instructions 516 to control the electrostatic precipitation unit 534. For example, the controller 502 may determine the amount of time a blend of feedstock and water may reside in the hydrothermal cleaning unit 532 and/or in an electrostatic precipitation unit 534. In another example, the controller 502 may determine the length of time a liquid may reside in the hydrothermal cleaning unit 532 and/or electrostatic precipitation unit 534.

FIG. 11 is a flow diagram, implemented in a controller, for managing the separation of water from a pre-treated feedstock, according to an embodiment. The method is detailed with reference to system 400 of FIG. 6. Unless otherwise specified, the actions of method 600 may be completed within the controller 402. Specifically, method 600 may be included in one or more programs, protocols, or instructions loaded into the memory of the controller 402 and executed on the processor or one or more processors of the controller 402. The order in which the operations are described is not intended to be construed as a limitation, and any number of the described blocks may be combined in any order and/or in parallel to implement the methods.

At block 602, the process may be initiated. In an example, a user may start the process at a user interface connected to the controller 402. At block 604, in response to an initiation signal the controller 402 may determine a temperature to heat the feedstock to and send a signal to heat the feedstock, from a feedstock tank 302 (or other source of feedstock), via a heat exchanger 306. At block 606, the controller 402 may determine a temperature to heat the water to and send a signal to heat the water, from a water tank 308 (or other water source), via a heat exchanger 314. In another example, rather than (or in addition to) heating the feedstock and/or water prior to mixing, the controller 402 may send a signal to heat exchanger 318 to heat the combination or blend of the water and feedstock.

At block 610, the feedstock may be blended with water at junction or flow control valve 316. The controller 402 may determine the amount of water to mix with the feedstock based on the type of feedstock and/or the amount of feedstock to be processed. At block 612, the blended water and feedstock may be transported to the hydrothermal reactor 320 for washing the feedstock to remove contaminates. After the mixture or blend has been in the hydrothermal reactor 320 for a sufficient amount of time, at block 616, the controller 402 may determine (for example, via a sensor) whether the effluent is at a sufficient or correct temperature and/or pressure for processing at the electrostatic precipitation unit 324. If the effluent is not at the correct pressure, the flow control valve 331 may let down the pressure of the effluent. If the effluent is not the correct temperature, at block 618, the heat exchanger may heat or cool the effluent to the proper temperature. Once the effluent is at the proper temperature, at block 620, the controller 402 may determine whether the amount of water contained in the effluent is sufficient. If the amount of water is not sufficient, at block 622, more water may be added to, injected into the stream of, and/or incorporated with the effluent, at which point the effluent may be considered influent.

Once the influent has the proper or correct amount of water and is at the proper or correct temperature and/or pressure, the influent, at block 624, may be transported to the electrostatic precipitation unit 324. The influent may reside in the crude desalter unit for a specified amount of time, at a specified temperature, and at a specified pressure. Further, a specified amount of power may be applied to create an electrostatic field within the electrostatic precipitation unit 324, thus, separating, at block 626, the contaminant-rich water from the feedstock.

EXPERIMENTAL

Experiments were conducted to test different feedstocks using the processes described herein. Samples of used cooking oil (UCO), degummed soy bean oil (SBO), and consolidated grain and barge degummed SBO were utilized. Water was introduced into each oil at maximum shear to provide an emulsified mixture. An electrical field was then applied to each mixture to evaluate the effects of the electrical field on the mixture versus the effects of no electrical field over time. Further, two methods were utilized to simulate an electrical field. The first method included the use of an electrical desalting dehydration apparatus (EDDA), which included two electrodes internal to a test tube. Due to the use of the electrodes within the test tube, 10% water was used, as any amount over may have caused a short between the electrodes. The voltage applied was 1,500 volts to further prevent shorts or other issues. The second method included the use of a desalting electric field simulator (DEFS) unit. In this method, an electrical field is applied via electrodes external to the tube, which allowed for 30% water in the mixture. Further, the voltage applied was 10,000 volts. The samples used were included in 100 milliliter test tubes.

For each experiment, data was generated, as shown in FIGS. 12A through 12H, illustrating the effects of voltage application versus no voltage application, over a period of time, on water separation. Further, after a particular period of time, the basic water and sediment (BS&W) value was determined via centrifugation via ASTM D-4007 (e.g., a method to determine free water in an emulsion or water unable to be removed from the emulsion via centrifuge).

Figure 12A:
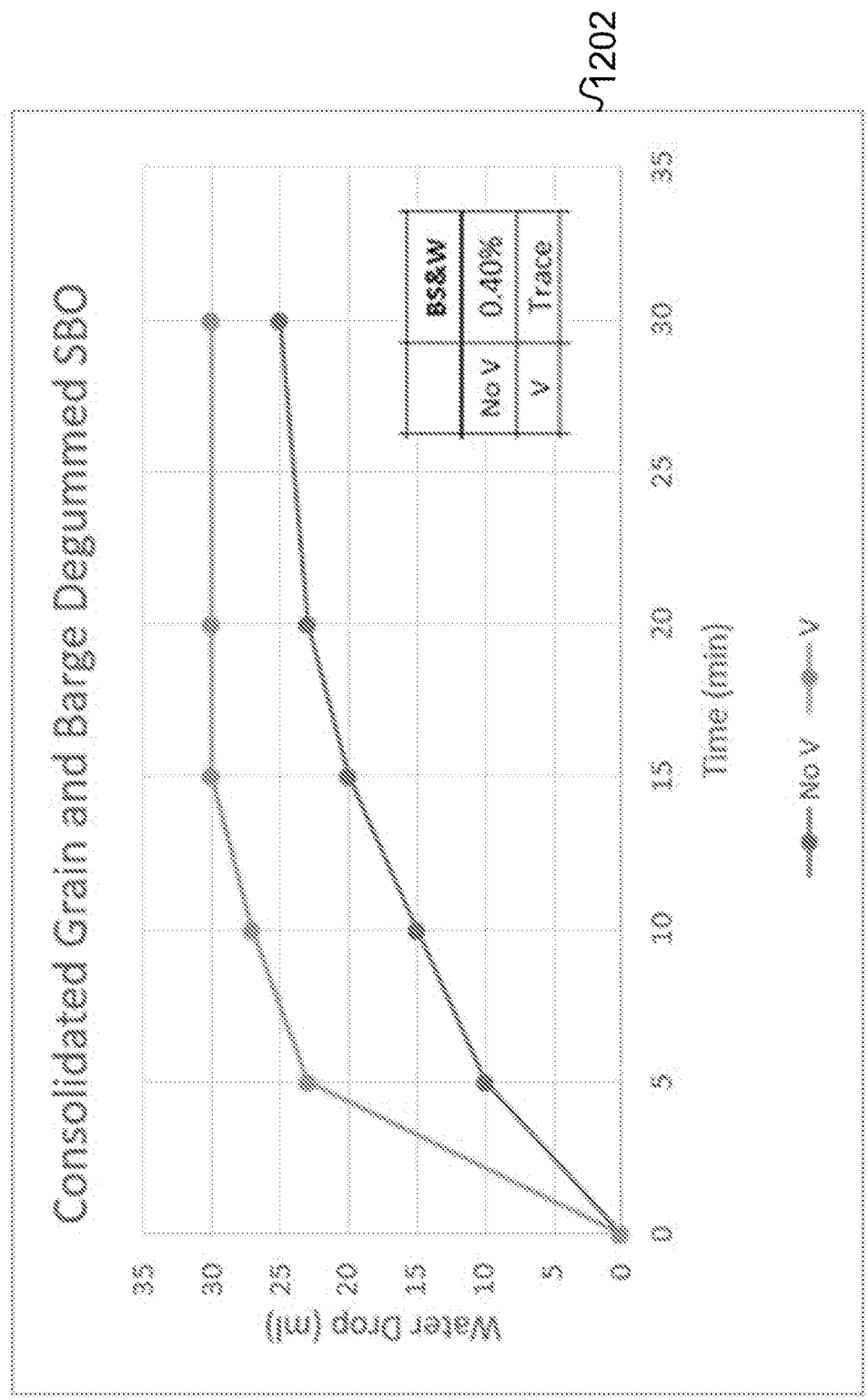

Referring first to FIG. 12A, a DEFS unit was utilized to compare voltage application versus no voltage for a mixture comprising 30 milliliters of water and 70 milliliters of consolidated grain and barge degummed SBO. In this case, after 15 minutes of voltage application, all of the water had dropped out of or separated from the mixture, whereas without voltage and after 30 minutes, 25 milliliters of the water had dropped out of or separated from the mixture (e.g., see chart 1202). The remaining oil in the samples used in the DEFS unit contained trace amounts of water, while the remaining oil in the other samples (e.g., no voltage) included 0.40% of water or BS&W.

Figure 12B:
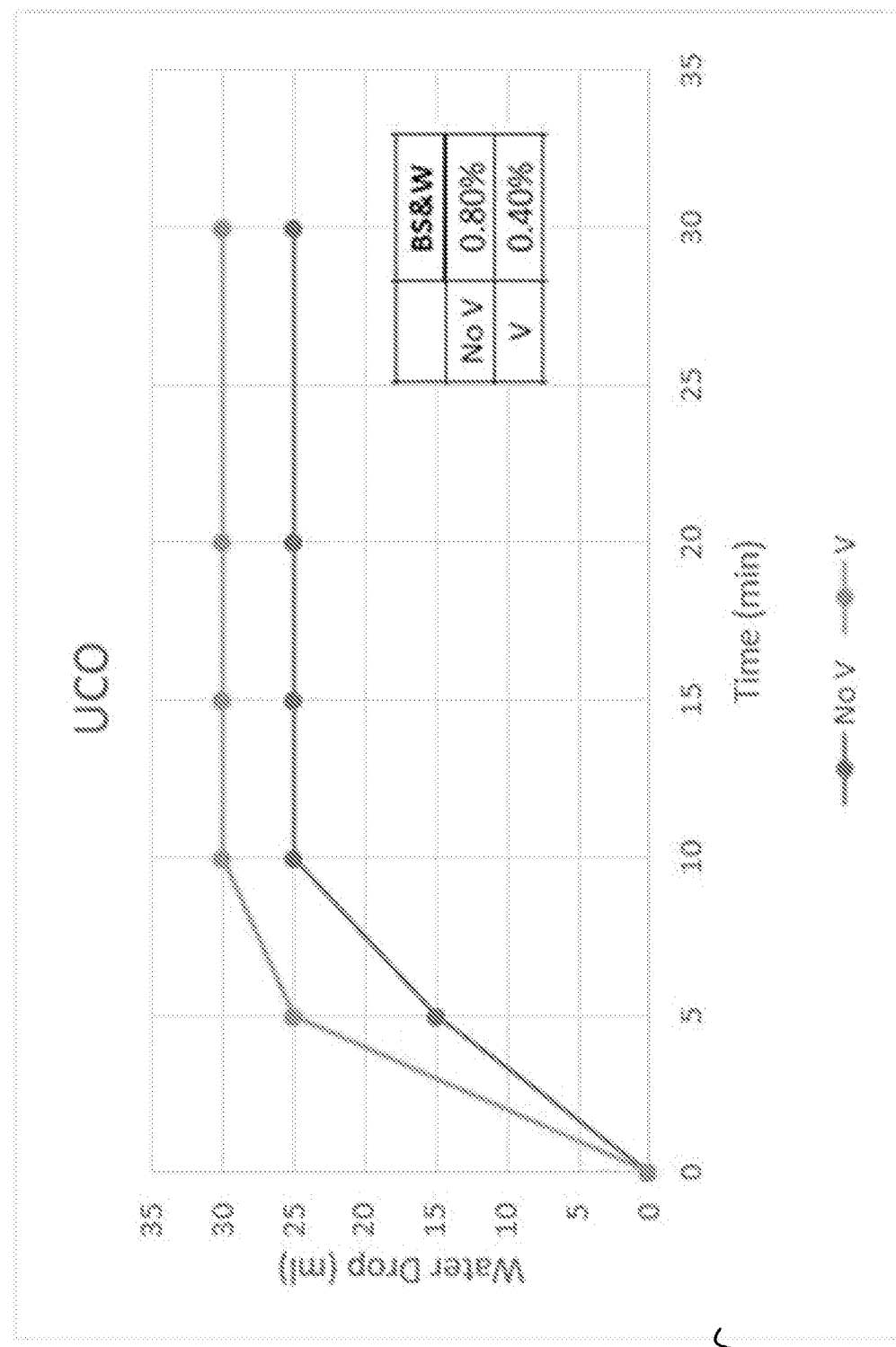

Referring next to FIG. 12B, a DEFS unit was utilized to compare voltage application versus no voltage for a mixture comprising 30 milliliters of water and 70 milliliters of UCO. In this case, after 10 minutes of voltage application, all of the water had dropped out of or separated from the mixture, whereas without voltage and after 30 minutes, 25 milliliters of the water had dropped out of or separated (e.g., 0.40% water remaining) from the mixture (e.g., see chart 1204). The remaining oil in the samples used in the DEFS unit contained 0.40% of water or BS&W, while the remaining oil in the other samples (e.g., no voltage) included 0.80% of water or BS&W.

Figure 12C:
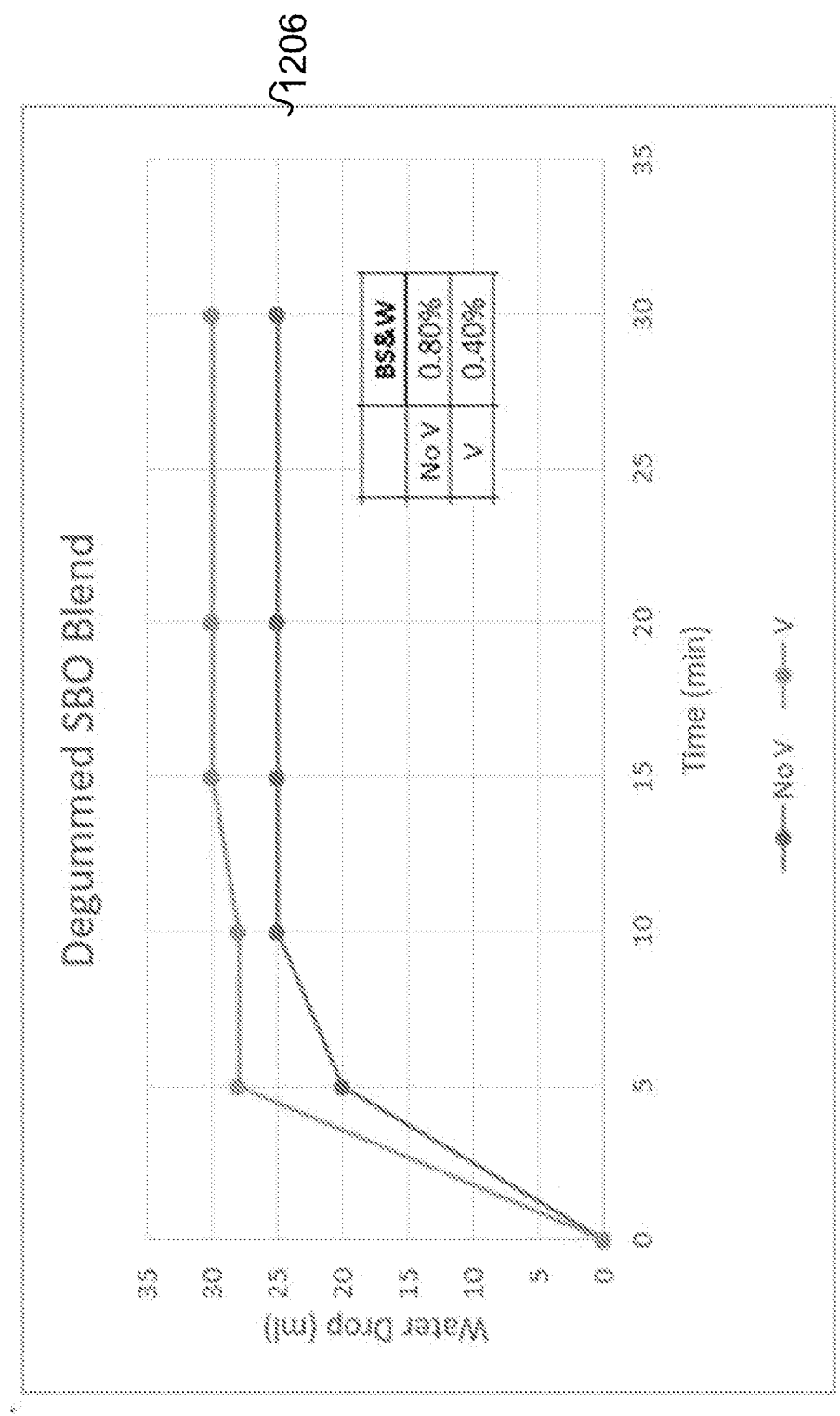

Referring next to FIG. 12C, a DEFS unit was utilized to compare voltage application versus no voltage for a mixture comprising 30 milliliters of water and 70 milliliters of degummed SBO. In this case, after 15 minutes of voltage application, all of the water had dropped out of or separated from the mixture, whereas without voltage and after 30 minutes, 25 milliliters of the water had dropped out of or separated (e.g., 0.40% water remaining) from the mixture (e.g., see chart 1206). The remaining oil in the samples used in the DEFS unit contained 0.40% of water or BS&W, while the remaining oil in the other samples (e.g., no voltage) included 0.80% of water or BS&W.

Figure 12D:
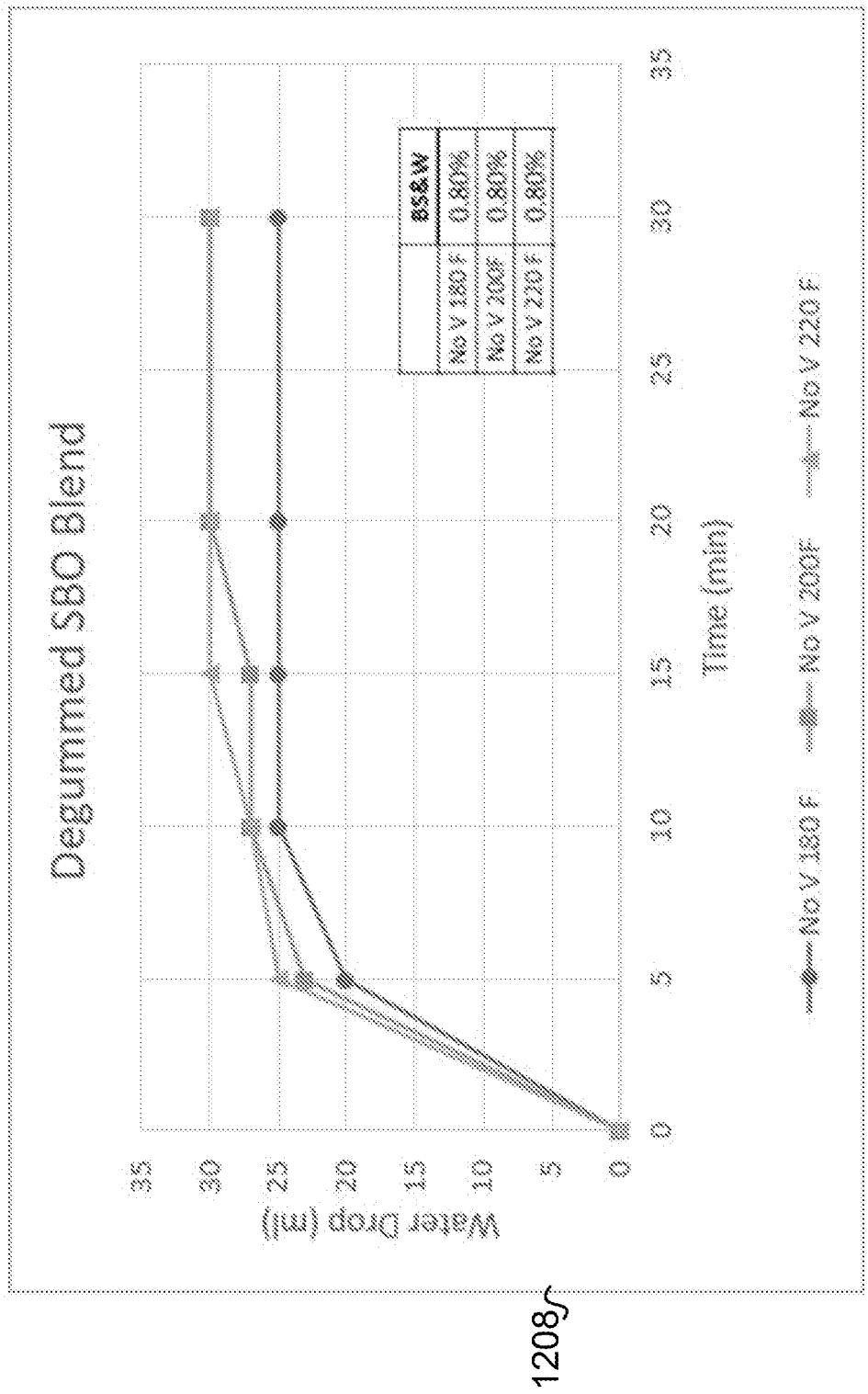

Referring next to FIG. 12D, several different temperatures were utilized in test tubes of mixtures with 30 milliliters of water and 70 milliliters of degummed SBO, particularly 180° F., 200° F., and 220° F. While complete water drop or separation occurred within 15 minutes at 220° F., complete water drop or separation occurred at 20 minutes for 200° F. and did not occur for 180° F. The remaining oil in each sample, however, did not improve over voltage application, as each mixture included 0.80% water or BS&W (e.g., see chart 1208).

Figure 12E:
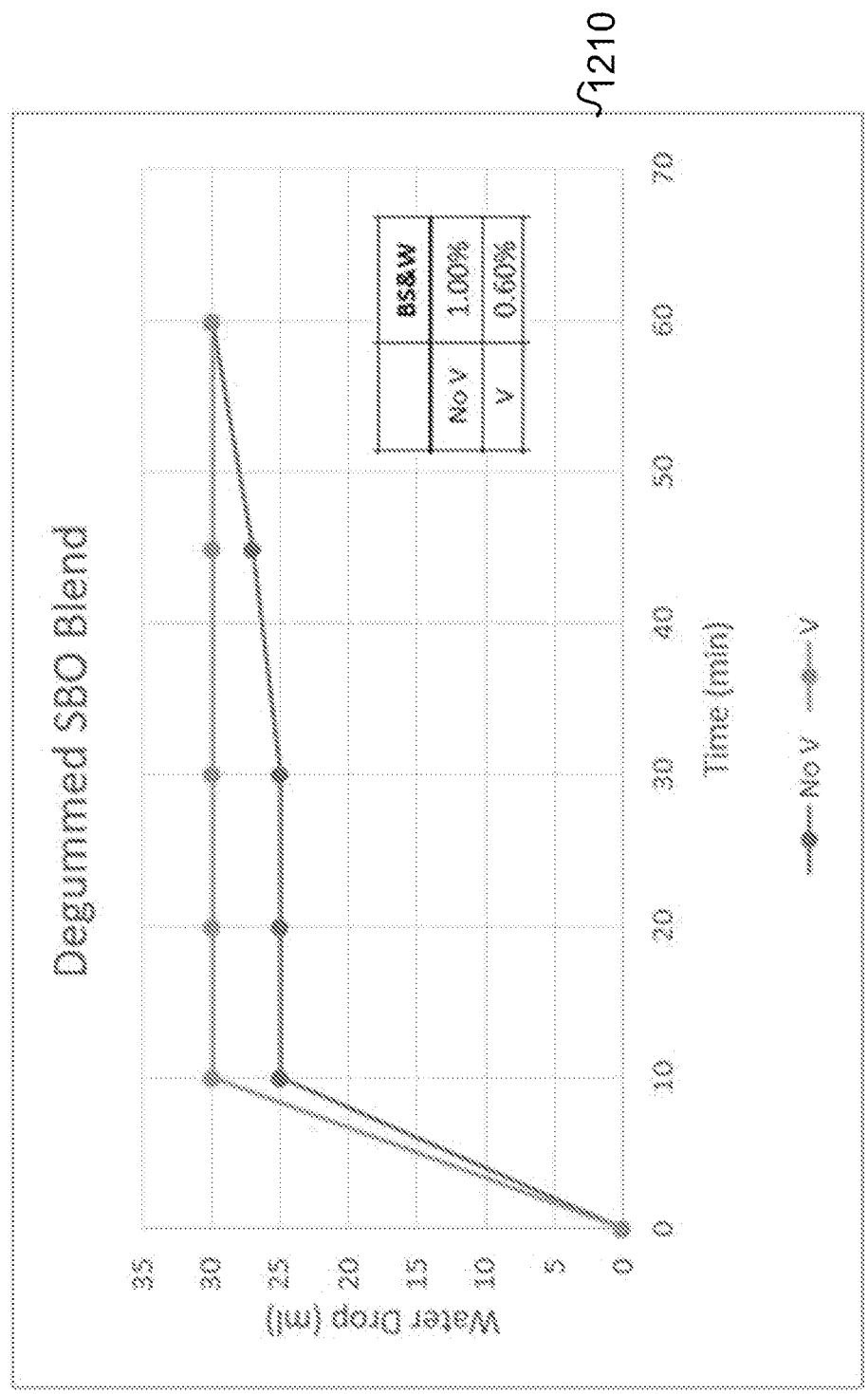

Referring first to FIG. 12E, a DEFS unit was utilized with a longer period of residence time (e.g., 60 minutes) to compare voltage application versus no voltage for a mixture comprising 30 milliliters of water and 70 milliliters of degummed SBO. In this case, after 15 minutes of voltage application, all of the water had dropped out of or separated from the mixture, whereas without voltage complete water drop was achieved after 60 minutes (e.g., see chart 1210). The remaining oil in the samples used in the DEFS unit contained 0.60% of water or BS&W, while the remaining samples included 1.00% of water or BS&W.

Figure 12F:
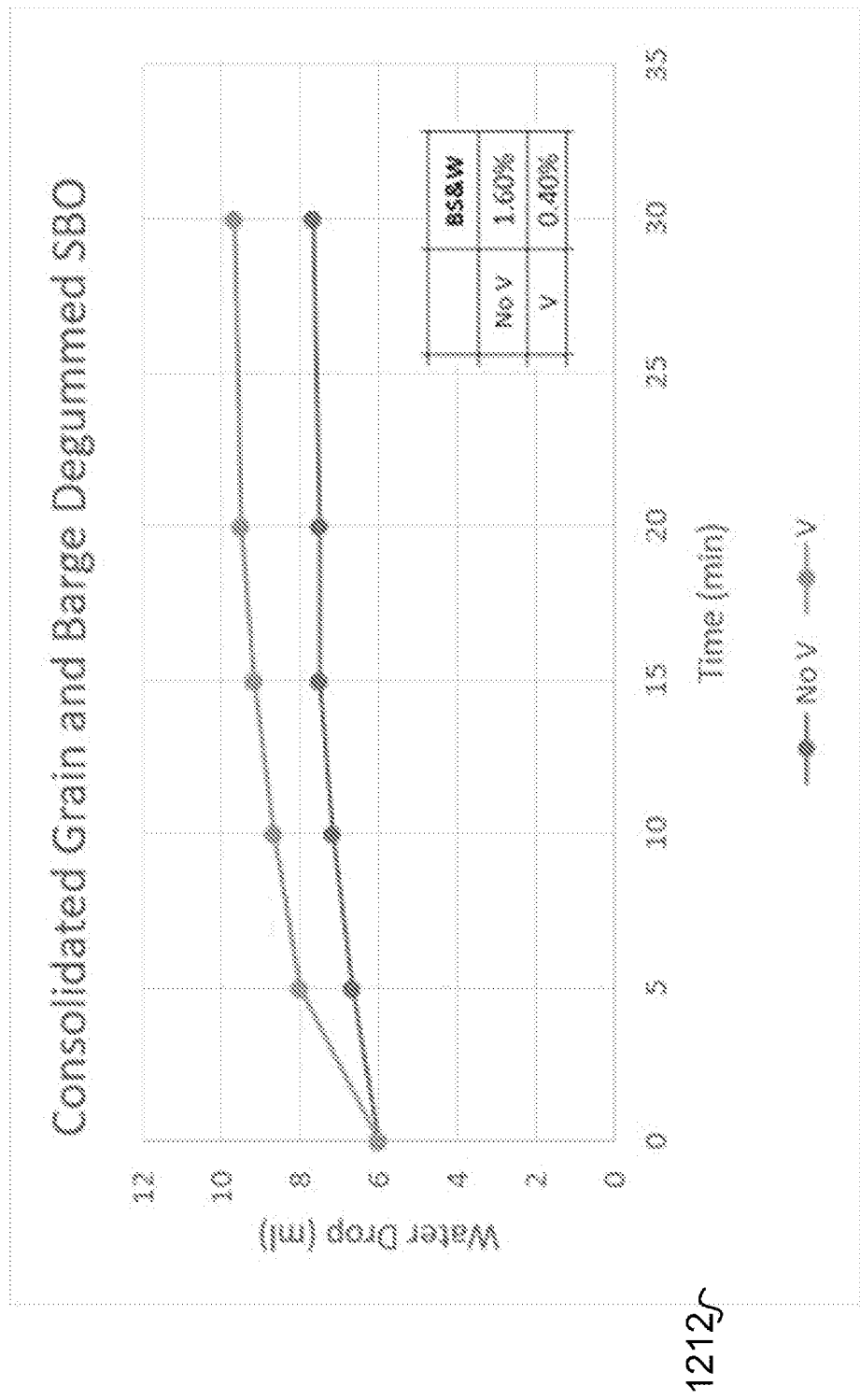

Referring next to FIG. 12F, an EDDA unit was utilized to compare voltage application versus no voltage for a mixture comprising 10 milliliters of water and 90 milliliters of consolidated grain and barge degummed SBO. In this case, after 30 minutes of voltage application, 9.7 milliliters of the water had dropped out of or separated from the mixture, whereas without voltage and after 30 minutes, 7.7 milliliters of the water had dropped out of or separated from the mixture (e.g., see chart 1210). The remaining oil in the samples used in the EDDA unit contained 0.40% of water or BS&W, while the remaining samples included 1.60% of water or BS&W.

Figure 12G:
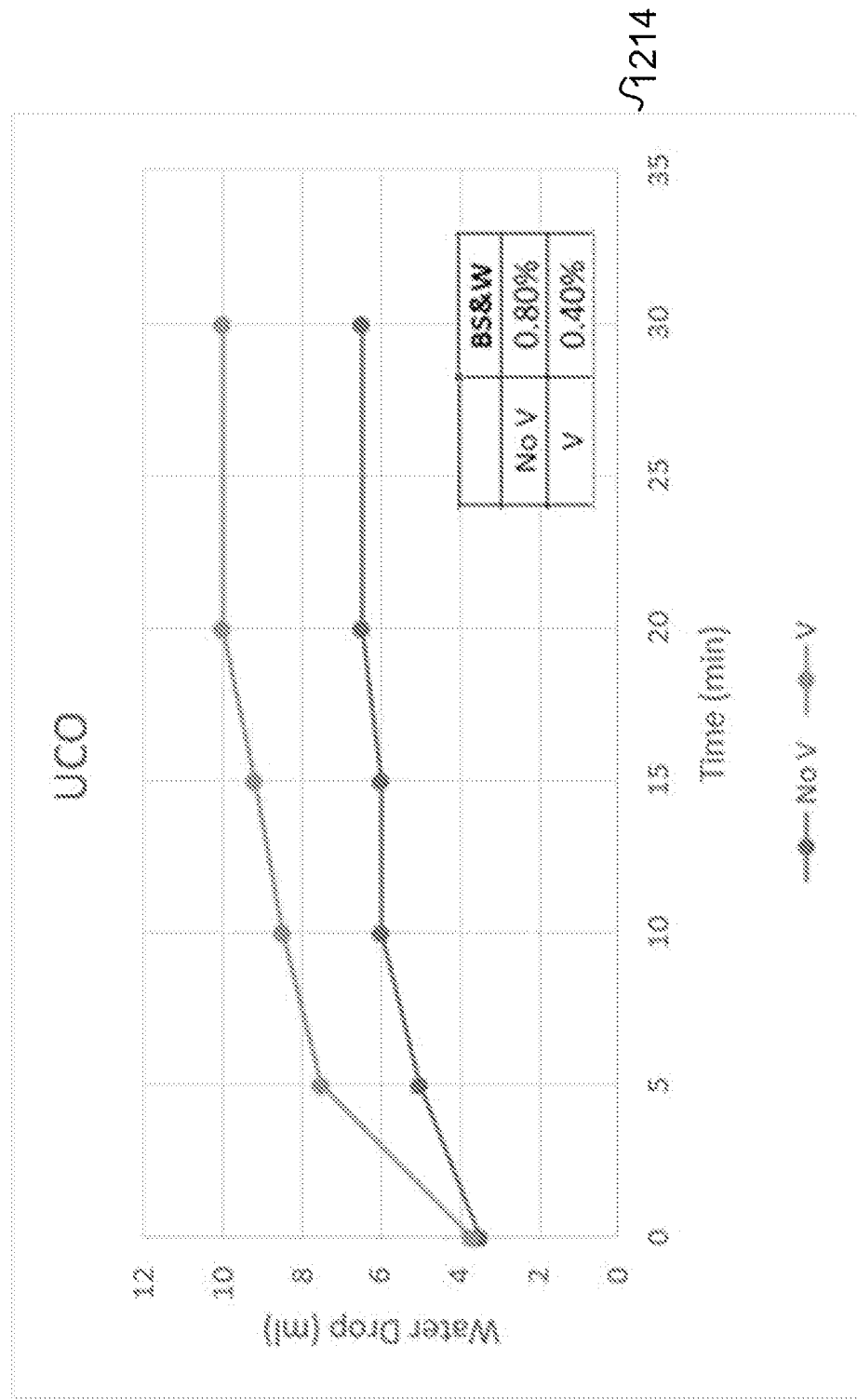

Referring next to FIG. 12G, an EDDA unit was utilized to compare voltage application versus no voltage for a mixture comprising 10 milliliters of water and 90 milliliters of UCO. In this case, after 20 minutes of voltage application, 10 milliliters of the water had dropped out of or separated from the mixture, whereas without voltage and after 30 minutes, 6.5 milliliters of the water had dropped out of or separated from the mixture (e.g., see chart 1210). The remaining oil in the samples used in the EDDA unit contained 0.40% of water or BS&W, while the remaining samples included 0.80% of water or BS&W.

Figure 12H:
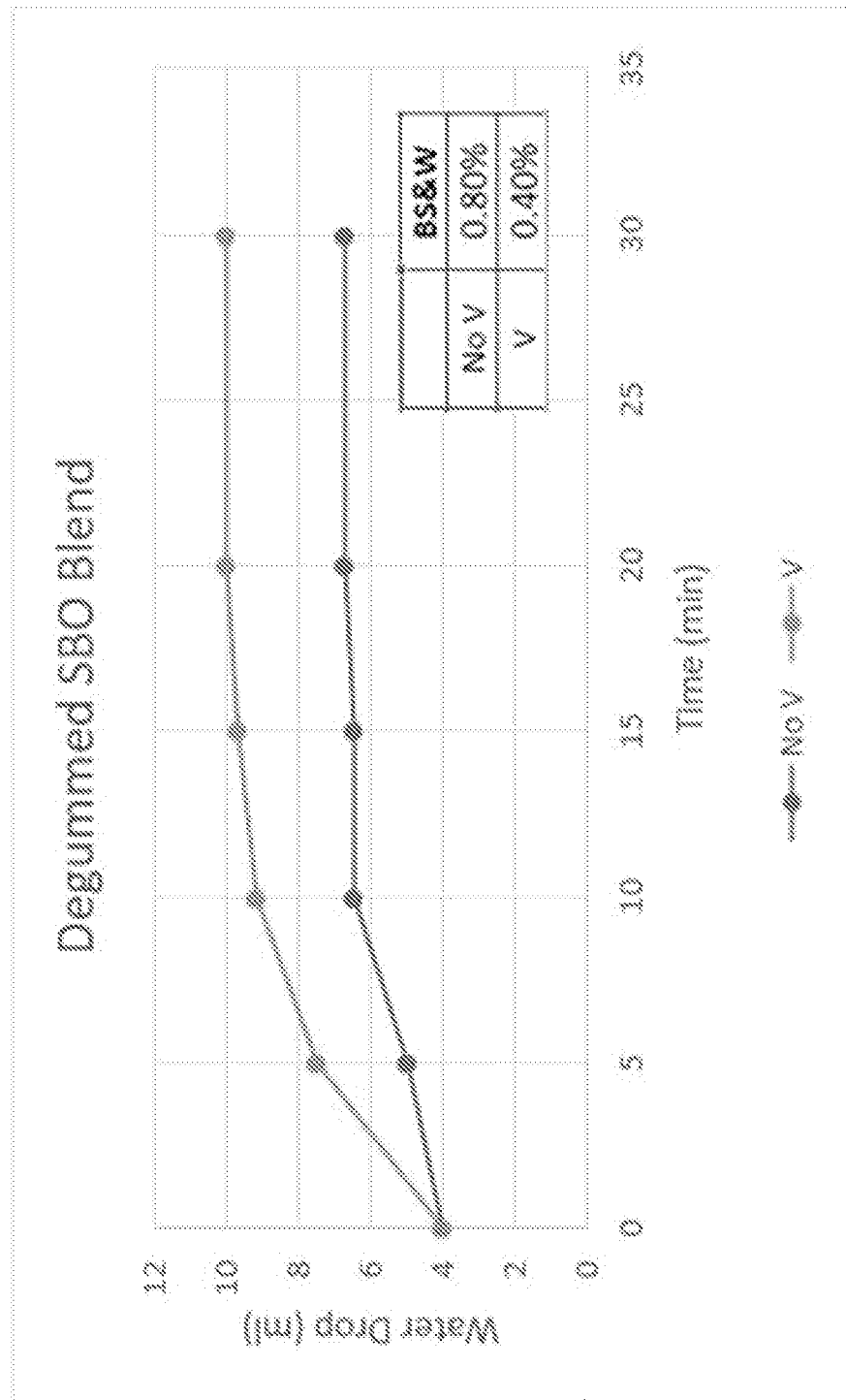

Referring next to FIG. 12H, an EDDA unit was utilized to compare voltage application versus no voltage for a mixture comprising 10 milliliters of water and 90 milliliters of degummed SBO. In this case, after 20 minutes of voltage application, 10 milliliters of the water had dropped out of or separated from the mixture, whereas without voltage and after 30 minutes, 6.5 milliliters of the water had dropped out of or separated from the mixture (e.g., see chart 1210). The remaining oil in the samples used in the EDDA unit contained 0.40% of water or BS&W, while the remaining samples included 0.80% of water or BS&W.

The present application, as noted above, is related to U.S. Provisional Application No. 63/198,606 filed Oct. 29, 2020, U.S. Provisional 63/198,937 filed Nov. 24, 2020, and U.S. Provisional Application No. 63/198,960 filed Nov. 25, 2020, the disclosures of which are incorporated herein by reference in their entirety.

In the drawings and specification, several embodiments of systems and methods to separate water from pre-treated feedstock have been disclosed, and although specific terms are employed, the terms are used in a descriptive sense only and not for purposes of limitation. Several embodiments of systems and methods have been described in considerable detail and with specific reference to the drawings. However, it will be apparent that various modifications and changes may be made within the spirit and scope of the embodiments of systems and methods as described in the foregoing specification, and such modifications and changes are to be considered equivalents and part of this disclosure.

The invention claimed is:

1. A refinery process for separating water and solids from a pre-treated and unfiltered renewable feedstock at a refinery, the process comprising:
   passing a blend of water, a renewable feedstock, and solids to a hydrothermal reactor of a refinery;
   washing contaminants, via the hydrothermal reactor, contained in the renewable feedstock into the water during a first time interval, thereby to produce a hydrothermal reactor effluent, the hydrothermal reactor effluent comprising the water, the renewable feedstock, and the solids;
   in response to a determination that the amount of water in the hydrothermal reactor effluent is less than a selected amount, injecting an additional amount of water into the hydrothermal reactor effluent, the additional amount of water based on the amount of the hydrothermal reactor effluent and an amount of water contained in the blend prior to the blend being passed to the hydrothermal reactor;
   after the first time interval, passing the hydrothermal reactor effluent to an electrostatic precipitation unit of the refinery;
   separating, by the electrostatic precipitation unit, the water containing the contaminants from the renewable feedstock in the hydrothermal reactor effluent, thereby to produce contaminant-rich water and a reduced-contaminant renewable feedstock during a second time interval;
   settling, in the electrostatic precipitation unit, the solids included in the renewable feedstock during the second time interval, thereby to produce a reduced-contaminant and reduced-solids renewable feedstock; and after the second time interval, passing the reduced-contaminant and reduced-solids renewable feedstock to a fractionation column of the refinery.

2. The process of claim 1, wherein a voltage generator external to the electrostatic precipitation unit and connected to a grid of electrodes within the electrostatic precipitation unit provides about 10,000 to about 30,000 volts to induce electrostatic precipitation.

3. The process of claim 1, wherein the renewable feedstock includes one or more of plant oils, algal and microbial oils, waste vegetable oils, yellow and brown grease, tallow, soap stock, pyrolysis oils from plastic or cellulose, and petroleum fractions, and wherein the solids are included in the renewable feedstock within the blend.

4. The process of claim 1, further comprising:
passing the contaminant-rich water and solids from the electrostatic precipitation unit to a waste-water treatment facility.

5. The process of claim 1, wherein the first time interval is between about 30 seconds to about 5 minutes and the second time interval is between about 10 minutes to about 60 minutes.

6. The process of claim 1, further comprising:
prior to passing the blend to the hydrothermal reactor of the refinery, injecting an amount of water into the renewable feedstock such that the amount of water in the blend is about 10% to about 50% of a total amount of the blend.

7. The process of claim 1, wherein the injecting the additional amount of water into the hydrothermal reactor effluent comprises injecting the additional amount of water into the hydrothermal reactor effluent downstream of the hydrothermal reactor, and wherein the additional amount of water is about 3% to about 10% of a total amount of the blend and the additional amount of water.

8. The process of claim 1, further comprising:
prior to separation by the electrostatic precipitation unit, passing the blend of water, renewable feedstock, and solids to a settler of the refinery;
settling, in the settler, a portion of the solids included in the renewable feedstock to a bottom portion of the settler during a third time interval thereby to produce a reduced solid blend of water and renewable feedstock; and
after the third time interval, passing the reduced solid blend of water and renewable feedstock to the electrostatic precipitation unit of the refinery.

9. The process of claim 1, further comprising:
in response to and based on a determination of an amount of the solids in the hydrothermal reactor effluent, determining the second time interval.

10. A method for separating water and removing solids from a pre-treated and unfiltered renewable feedstock, the method comprising:
receiving a hydrothermal reactor effluent from a hydrothermal reactor, the hydrothermal reactor effluent produced from the hydrothermal reactor and comprising a renewable feedstock and contaminant-rich water;
in response to a determination that an amount of water in the hydrothermal reactor effluent is less than a selected amount, injecting an additional amount of water into the hydrothermal reactor effluent, the additional amount of water based on the amount of the hydrothermal reactor effluent and an amount of water contained in a blend prior to the blend being passed to the hydrothermal reactor;
passing the hydrothermal reactor effluent to an electrostatic precipitation unit;
separating, via the electrostatic precipitation unit, the contaminant-rich water from the renewable feedstock, thereby to produce contaminant-rich water and a reduced-contaminant renewable feedstock; and
during the separating, settling in the electrostatic precipitation unit, an amount of solids in the renewable feedstock, thereby to produce a reduced-contaminant and reduced-solids renewable feedstock.

11. The method of claim 10, wherein the contaminants include one or more of metals or phosphorous.

12. The method of claim 10, wherein the electrostatic precipitation unit comprises an electrostatic precipitation unit positioned in a location separate from a refinery.

13. The method of claim 12, further comprising:
passing the reduced-contaminant and reduced-solids renewable feedstock to the refinery, via a transportation vehicle, for further processing.

14. The method of claim 10, wherein the electrostatic precipitation unit separates the contaminant-rich water from the renewable feedstock in about 10 minutes to about 30 minutes.

15. The method of claim 10, wherein the electrostatic precipitation unit comprises an electronic precipitation unit located at a refinery.

16. The method of claim 15, further comprising:
passing the reduced-contaminant and reduced-solids renewable feedstock to one or more of a fractionation column or distillation tower of the refinery.

17. The method of claim 10, wherein the renewable feedstock comprises a consolidated grain and barge degummed soybean oil (SBO), and wherein after the separating, via the electrostatic precipitation unit, the reduced-contaminant and reduced-solids renewable feedstock contains trace amounts of water.

18. The method of claim 17, wherein separation of the renewable feedstock occurs in about 15 minutes.

19. The method of claim 10, wherein the renewable feedstock includes one or more of used cooking oil or soybean oil, and wherein after the separating, via the electrostatic precipitation unit, the reduced-contaminant and reduced-solids renewable feedstock contains less than 0.4% of water in relation to the total amount of the reduced-contaminant and reduced-solids renewable feedstock.

20. The method of claim 10, further comprising:
prior to separation by the electrostatic precipitation unit, passing the blend to a settler;
settling, in the settler, a portion of an amount of solids included in the blend to a bottom portion of the settler during a time interval, thereby to produce a reduced solid blend of contaminant-rich water and renewable feedstock; and
after the time interval, passing the reduced solid blend of contaminant-rich water and renewable feedstock to the electrostatic precipitation unit.

21. The method of claim 10, wherein the electrostatic precipitation unit comprises a crude desalter unit.

22. The method of claim 10, further comprising:
in response to and based on a determination of a total amount of solids in the hydrothermal reactor effluent, determining a residence time within the electrostatic precipitation electrostatic precipitation unit.

23. A refinery process for separating water and solids from a pre-treated and unfiltered renewable feedstock at a refinery, the process comprising:

heating, via a first heat exchanger of a refinery, a renewable feedstock, the renewable feedstock to include an amount of solids;
heating, via a second heat exchanger of the refinery, water;
blending the renewable feedstock and water, thereby to define a blend of water, a renewable feedstock, and solids;
passing the blend to a hydrothermal reactor of a refinery;
washing contaminants, via the hydrothermal reactor, contained in the renewable feedstock into the water during a first time interval, thereby to produce a hydrothermal reactor effluent;
injecting an additional amount of water into the hydrothermal reactor effluent in response to a determination that an amount of water in the hydrothermal reactor effluent is less than a selected amount;
determining the additional amount of water based on the amount of the hydrothermal reactor effluent and an amount of water in the blend prior to the blend being passed to the hydrothermal reactor;
passing the hydrothermal reactor effluent to an electrostatic precipitation unit of the refinery;
separating, by the electrostatic precipitation unit, the water containing the contaminants from the renewable feedstock in the hydrothermal reactor effluent to produce contaminant-rich water and a reduced-contaminant renewable feedstock during a second time interval;
settling, in the electrostatic precipitation unit, the solids included in the renewable feedstock during the second time interval, thereby to produce a reduced-contaminant and reduced-solids renewable feedstock; and
after the second time interval, passing the reduced-contaminant and reduced-solids renewable feedstock to a fractionation column of the refinery.

24. The process of claim 23, further comprising:
after the first time interval and prior to passing the hydrothermal reactor effluent to the electrostatic precipitation unit:
determining whether a temperature of the hydrothermal reactor effluent is at a temperature sufficient for electrostatic precipitation; and
in response to a determination that the temperature is not sufficient for electrostatic precipitation, adjusting the temperature of the hydrothermal reactor effluent.

25. The process of claim 23, wherein the selected amount comprises an amount of water sufficient for electrostatic precipitation.

26. The process of claim 23, further comprising providing about 10,000 to about 15,000 volts to induce electrostatic precipitation within the electrostatic precipitation unit with a voltage generator external to the electrostatic precipitation unit when connected to a grid of electrodes within the electrostatic precipitation unit.

27. The process of claim 23, further comprising:
prior to heating the renewable feedstock, passing the renewable feedstock through a filter.

28. The process of claim 27, wherein the filter comprises one of a mesh filter or a basket filter.

29. The process of claim 28, wherein the mesh filter includes a 5 micron to 50 mesh.

* * * * *